US006029126A

United States Patent [19]

Malvar

[11] Patent Number: 6,029,126

[45] Date of Patent: Feb. 22, 2000

[54] SCALABLE AUDIO CODER AND DECODER

[75] Inventor: Henrique S. Malvar, Redmond, Wash.

[73] Assignee: Microsoft Corporation, Redmond, Wash.

[21] Appl. No.: 09/109,345

[22] Filed: Jun. 30, 1998

[51] Int. Cl.[7] .............................. G10L 3/02; G10L 9/16; H04B 1/66

[52] U.S. Cl. .......................... 704/204; 704/230; 704/500

[58] Field of Search .................................... 704/203, 204, 704/230, 500, 503, 504

[56] References Cited

U.S. PATENT DOCUMENTS

| | | | |
|---|---|---|---|
| 4,754,492 | 6/1988 | Malvar | 382/268 |
| 5,715,280 | 2/1998 | Sandberg et al. | 375/260 |
| 5,805,739 | 9/1998 | Malvar et al. | 382/253 |

OTHER PUBLICATIONS

Cheung et al. "Incorporation of Biorthogonality into Lapped Transforms for Audio Compression," May 1995 International Conference on Acoustics, Speech, and Signal Processing, ICASSP–95., IEEE, vol. 5 pp. 3079 to 3308.

John Princen, "The Design of Nonuniform Modulated Filterbanks," IEEE Transactions on Signal Processing, vol. 43, No. 11, pp. 2550 to 2560, Nov. 1995.

Henrique Malvar, "Enhancing the Performance of Subband Audio Coders for Speech Signals," Proceedings of the May 1998 IEEE International Symposium on Circuits and Systems, vol. 5, pp. 98 to 101.

Henrique Malvar, "Biorthogonal and Nonuniform Lapped Transforms for Transform Coding with Reduced Blocking and Ringing Artifacts," IEEE Transactions on Signal Processing, vol. 46, No. 4, pp. 1043 to 1053, Apr. 1998.

L.G. Roberts, "Picture Coding Using Pseudo–Random Noise," IRE Trans. Information Theory, vol. Feb. 1962, pp. 145–154.

R. Zelinski and P. Noll, "Adaptive Transform Coding of Speech Signals," IEEE Trans. on Acoustics, Speech, and Signal Processing, vol. ASSP–25, No. 4, pp. 299–309, Aug. 1977.

M. Krasner, "The Critical Band Coder Digital Encoding of Speech Signals Based On the Perceptual Requirements of the Auditory System," Proc. ICASSP 1981, pp. 327–331.

K. Brandenburg, "OCF—A New Coding Algorithm For High Quality Sound Signals," Proc. IEEE ICASSP'89, Dallas, TX, Apr. 1987, pp. 141–144.

H.S. Malvar and R. Duarte, "Transform/Subband Coding Of Speech With The Lapped Orthogonal Transform", Proc. IEEE ISACS'89, Portland, OR, May 1989, pp. 1268–1271.

D. Pan, "A Tutorial On MPEG Audio Compression," IEEE Mutimedia, vol. 2, Summer 1995, pp. 60–74.

V.M. Purat and P. Noll, "Audio Coding With A Dynamic Wavelet Packet Decomposition Based on Frequency–Varying Modulated Lapped Transforms," Proc. IEEE ICASSP'96, Atlanta, GA, May 1996, pp. 102–1024.

(List continued on next page.)

*Primary Examiner*—David R. Hudspeth
*Assistant Examiner*—Martin Lerner
*Attorney, Agent, or Firm*—Lyon, Harr & DeFrank; Edmond A. DeFrank

[57] ABSTRACT

The coder/decoder (codec) system of the present invention includes a coder and a decoder. The coder includes a multi-resolution transform processor, such as a modulated lapped transform (MLT) transform processor, a weighting processor, a uniform quantizer, a masking threshold spectrum processor, an entropy encoder, and a communication device, such as a multiplexor (MUX) for multiplexing (combining) signals received from the above components for transmission over a single medium. The decoder comprises inverse components of the encoder, such as an inverse multi-resolution transform processor, an inverse weighting processor, an inverse uniform quantizer, an inverse masking threshold spectrum processor, an inverse entropy encoder, and an inverse MUX. With these components, the present invention is capable of performing resolution switching, spectral weighting, digital encoding, and parametric modeling.

20 Claims, 13 Drawing Sheets

OTHER PUBLICATIONS

F. Fabris, A. Sgarro, and R. Pauletti, "Tunstall Adaptive Coding and Miscoding, IEE Trans. on Information Theory," vol. 42, N. 6, pp. 2167–2180, Nov. 1996.

S. Savari and R. Gallagher, "Generalized Tunstall Codes for Sources with Memory", IEE Trans On Information Theory, vol. 43, No. 2, pp. 658–668, Mar. 1997.

M. Bosi, K. Brandeburg, S. Quackenbush, L. Fielder, K. Akagiri, H. Fuchs, M. Dietz, J. Herre, G. Davidson and Y. Oikawa, "ISO/IEC MPEG–2 Advanced Audio Coding," J. Audio Eng. Soc., vol. 45, Oct. 1997, pp. 789–814.

Henrique S. Malvar, "Lapped Biorthogonal Transforms For Transform Coding With Reduced Blocking and Ringing Artifacts," Presented at the IEEE ICASSP Conference, Munich, Apr. 1997, pp. 2421 to 2424.

SCALABLE AUDIO CODER AND DECODER

BACKGROUND OF THE INVENTION

1. Field of the Invention

The present invention relates to a system and method for compressing digital signals, and in particular, a system and method for enabling scalable encoding and decoding of digitized audio signals.

2. Related Art

Digital audio representations are now commonplace in many applications. For example, music compact discs (CDs), Internet audio clips, satellite television, digital video discs (DVDs), and telephony (wired or cellular) rely on digital audio techniques. Digital representation of an audio signal is achieved by converting the analog audio signal into a digital signal with an analog-to-digital (A/D) converter. The digital representation can then be encoded, compressed, stored, transferred, utilized, etc. The digital signal can then be converted back to an analog signal with a digital-to-analog (D/A) converter, if desired. The A/D and D/A converters sample the analog signal periodically, usually at one of the following standard frequencies: 8 kHz for telephony, Internet, videoconferencing; 11.025 kHz for Internet, CD-ROMs, 16 kHz for videoconferencing, long-distance audio broadcasting, Internet, future telephony; 22.05 kHz for CD-ROMs, Internet; 32 kHz for CD-ROMs, videoconferencing, ISDN audio; 44.1 kHz for Audio CDs; and 48 kHz for Studio audio production.

Typically, if the audio signal is to be encoded or compressed after conversion, raw bits produced by the A/D are usually formatted at 16 bits per audio sample. For audio CDs, for example, the raw bit rate is 44.1 kHz×16 bits/sample=705.6 kbps (kilobits per second). For telephony, the raw rate is 8 kHz×8 bits/sample=64 kbps. For audio CDs, where the storage capacity is about 700 megabytes (5,600 megabits), the raw bits can be stored, and there is no need for compression. MiniDiscs, however, can only store about 140 megabytes, and so a compression of about 4:1 is necessary to fit 30 min to 1 hour of audio in a 2.5" MiniDisc.

For Internet telephony and most other applications, the raw bit rate is too high for most current channel capacities. As such, an efficient encoder/decoder (commonly referred to as coder/decoder, or codec) with good compressions is used. For example, for Internet telephony, the raw bit rate is 64 kbps, but the desired channel rate varies between 5 and 10 kbps. Therefore, a codec needs to compress the bit rate by a factor between 5 and 15, with minimum loss of perceived audio signal quality.

With the recent advances in processing chips, codecs can be implemented either in dedicated hardware, typically with programmable digital signal processor (DSP) chips, or in software in a general-purpose computer. Therefore, it is desirable to have codecs that can, for example, achieve: 1) low computational complexity (encoding complexity usually not an issue for stored audio); 2) good reproduction fidelity (different applications will have different quality requirements); 3) robustness to signal variations (the audio signals can be clean speech, noisy speech, multiple talkers, music, etc. and the wider the range of such signals that the codes can handle, the better); 4) low delay (in real-time applications such as telephony and videoconferencing); 5) scalability (ease of adaptation to different signal sampling rates and different channel capacities—scalability after encoding is especially desirable, i.e., conversion to different sampling or channel rates without re-encoding); and 6) signal modification in the compressed domain (operations such as mixing of several channels, interference suppression, and others can be faster if the codec allows for processing in the compressed domain, or at least without full decoding and re-encoding).

Currently, commercial systems use many different digital audio technologies. Some examples include: ITU-T standards: G.711, G.726, G.722, G.728, G.723.1, and G.729; other telephony standards: GSM, half-rate GSM, cellular CDMA (IS-733); high-fidelity audio: Dolby AC-2 and AC-3, MPEG LII and LIII, Sony MiniDisc; Internet audio: ACELP-Net, DolbyNet, PictureTel Siren, RealAudio; and military applications: LPC-10 and USFS-1016 vocoders.

However, these current codecs have several limitations. Namely, the computational complexity of current codecs is not low enough. For instance, when a codec is integrated within an operating system, it is desirable to have the codec run concurrently with other applications, with low CPU usage. Another problem is the moderate delay. It is desirable to have the codes allow for an entire audio acquisition/playback system to operate with a delay lower than 100 ms, for example, to enable real-time communication.

Another problem is the level of robustness to signal variations. It is desirable to have the codec handle not only clean speech, but also speech degraded by reverberation, office noise, electrical noise, background music, etc. and also be able to handle music, dialing tones, and other sounds. Also, a disadvantage of most existing codecs is their limited scalability and narrow range of supported signal sampling frequencies and channel data rates. For instance, many current applications usually need to support several different codecs. This is because many codecs are designed to work with only certain ranges of sampling rates. A related desire is to have a codes that can allow for modification of the sampling or data rates without the need for re-encoding.

Another problem is that in multi-party teleconferencing, servers have to mix the audio signals coming from the various participants. Many codecs require decoding of all streams prior to mixing. What is needed is a codec that supports mixing in the encoded or compressed domain without the need for decoding all streams prior to mixing.

Yet another problem occurs in integration with signal enhancement functions. For instance, audio paths used with current codecs may include, prior to processing by the codecs, a signal enhancement module. As an example, in hands-free teleconferencing the signals coming from the speakers are be captured by the microphone, interfering with the voice of the local person. Therefore an echo cancellation algorithm is typically used to remove the speaker-to-microphone feedback. Other enhancement operators may include automatic gain control, noise reducers, etc. Those enhancement operators incur a processing delay that will be added to the coding/decoding delay. Thus, what is needed is a codes that enables a relatively simple integration of enhancement processes with the codec, in such a way that all such signal enhancements can be performed without any delay in addition to the codec delay.

A further problem associated with codecs is lack of robustness to bit and packet losses. In most practical real-time applications, the communication channel is not free from errors. Wireless channels can have significant bit error rates, and packet-switched channels (such as the Internet) can have significant packet losses. As such, what is needed is a codec that allows for a loss, such as of up to 5%, of the compressed bitstream with small signal degradation.

Whatever the merits of the above mentioned systems and methods, they do not achieve the benefits of the present invention.

SUMMARY OF THE INVENTION

To overcome the limitations in the prior art described above, and to overcome other limitations that will become apparent upon reading and understanding the present specification, the present invention is embodied in a system and method for enabling scalable encoding and decoding of audio signals with a novel coder/decoder (codec).

The codec system of the present invention includes a coder and a decoder. The coder includes a multi-resolution transform processor, such as a modulated lapped transform (MLT) transform processor, a weighting processor, a uniform quantizer, a masking threshold spectrum processor, an entropy encoder, and a communication device, such as a multiplexor (MUX) for multiplexing (combining) signals received from the above components for transmission over a single medium. The decoder comprises inverse components of the encoder, such as an inverse multi-resolution transform processor, an inverse weighting processor, an inverse uniform quantizer, an inverse masking threshold spectrum processor, an inverse entropy encoder, and an inverse MUX. With these components, the present invention is capable of performing resolution switching, spectral weighting, digital encoding, and parametric modeling.

Some features and advantages of the present invention include low computational complexity. When the codec of the present invention is integrated within an operating system, it can run concurrently with other applications, with low CPU usage. The present codec allows for an entire audio acquisition/playback system to operate with a delay lower than 100 ms, for example, to enable real-time communication. The present codec has a high level of robustness to signal variations and it can handle not only clean speech, but also speech degraded by reverberation, office noise, electrical noise, background music, etc. and also music, dialing tones, and other sounds. In addition, the present codec is scalable and large ranges of signal sampling frequencies and channel data rates are supported. A related feature is that the present codec allows for modification of the sampling or data rates without the need for re-encoding. For example, the present codec can convert a 32 kbps stream to a 16 kbps stream without the need for full decoding and re-encoding. This enables servers to store only higher fidelity versions of audio clips, converting them on-the-fly to lower fidelity whenever necessary.

Also, for multi-party teleconferencing, the present codec supports mixing in the encoded or compressed domain without the need for decoding of all streams prior to mixing. This significantly impacts the number of audio streams that a server can handle. Further, the present codec enables a relatively simple integration of enhancement processes in such a way that signal enhancements can be performed without any delay in addition to delays by the codec. Moreover, another feature of the present codec is its robustness to bit and packet losses. For instance, in most practical real-time applications, the communication channel is not free from errors. Since wireless channels can have significant bit error rates, and packet-switched channels (such as the Internet) can have significant packet losses the present codec allows for a loss, such as of up to 5%, of the compressed bitstream with small signal degradation.

The foregoing and still further features and advantages of the present invention as well as a more complete understanding thereof will be made apparent from a study of the following detailed description of the invention in connection with the accompanying drawings and appended claims.

BRIEF DESCRIPTION OF THE DRAWINGS

Referring now to the drawings in which like reference numbers represent corresponding parts throughout.

DETAILED DESCRIPTION OF THE INVENTION

In the following description of the invention, reference is made to the accompanying drawings, which form a part hereof, and in which is shown by way of illustration a specific example in which the invention may be practiced. It is to be understood that other embodiments may be utilized and structural changes may be made without departing from the scope of the present invention.

Introduction

Transform or subband coders are employed in many modern audio coding standards, usually at bit rates of 32 kbps and above, and at 2 bits/sample or more. At low rates, around and below 1 bit/sample, speech codecs such as G.729 and G.723.1 are used in teleconferencing applications. Such codecs rely on explicit speech production models, and so their performance degrades rapidly with other signals such as multiple speakers, noisy environments and especially music signals.

With the availability of modems with increased speeds, many applications may afford as much as 8–12 kbps for narrowband (3.4 kHz bandwidth) audio, and maybe higher rates for higher fidelity material. That raises an interest in coders that are more robust to signal variations, at rates similar to or a bit higher than G.729, for example.

The present invention is a coder/decoder system (codec) with a transform coder that can operate at rates as low as 1 bit/sample (e.g. 8 kbps at 8 kHz sampling) with reasonable quality. To improve the performance under clean speech conditions, spectral weighting and a run-length and entropy encoder with parametric modeling is used. As a result, encoding of the periodic spectral structure of voiced speech is improved.

The present invention leads to improved performance for quasi-periodic signals, including speech. Quantization tables are computed from only a few parameters, allowing for a high degree of adaptability without increasing quantization table storage. To improve the performance for transient signals, the present invention uses a nonuniform modulated lapped biorthogonal transform with variable resolution without input window switching. Experimental results show that the present invention can be used for good quality signal reproduction at rates close to one bit per sample, quasi-transparent reproduction at two bits per sample, and perceptually transparent reproduction at rates of three or more bits per sample.

Exemplary Operating Environment

Figure 1:
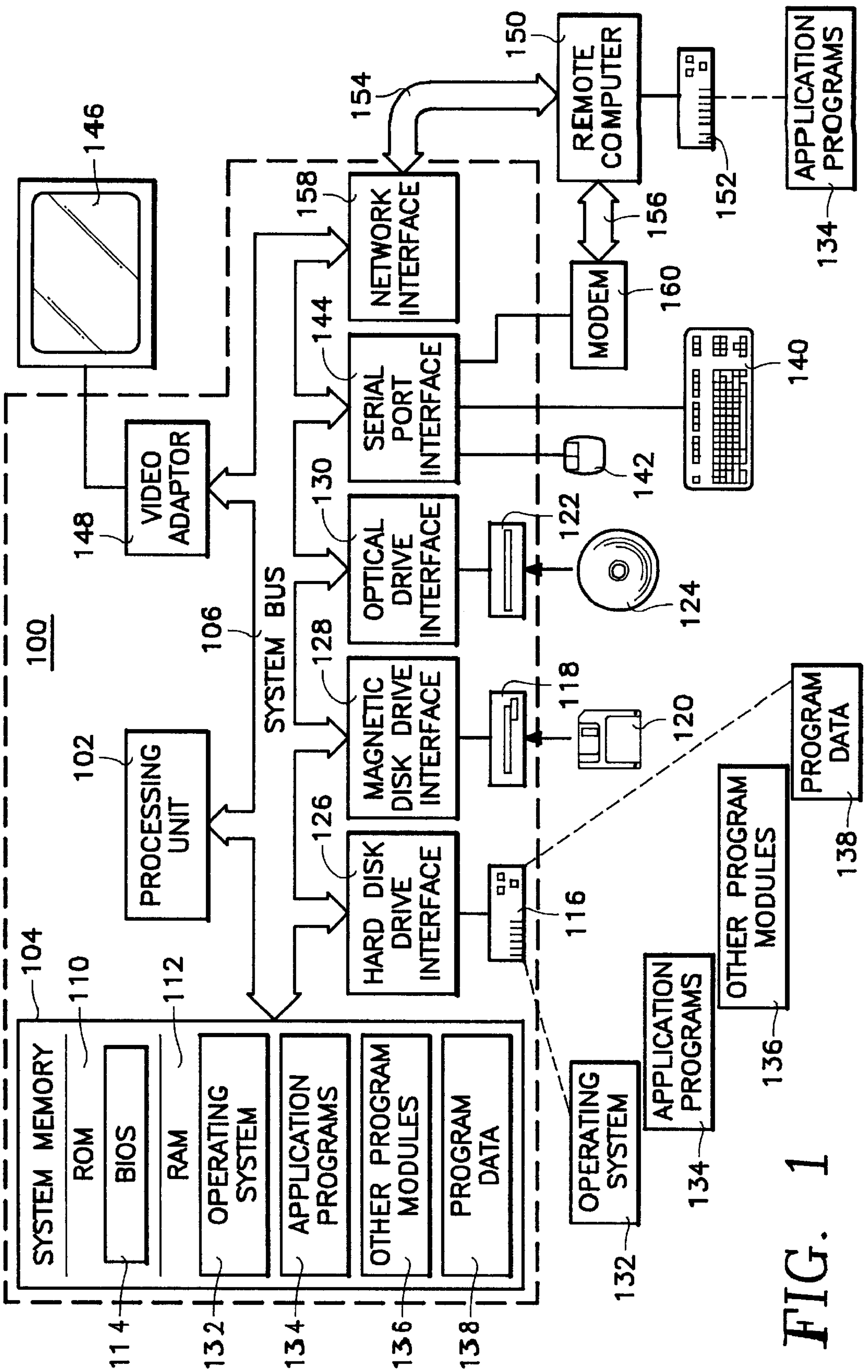
FIG. 1 is a block diagram illustrating an apparatus for carrying out the invention.

FIG. 1 and the following discussion are intended to provide a brief, general description of a suitable computing environment in which the invention may be implemented. Although not required, the invention will be described in the general context of computer-executable instructions, such as program modules, being executed by a personal computer. Generally, program modules include routines, programs, objects, components, data structures, etc. that perform particular tasks or implement particular abstract data types. Moreover, those skilled in the art will appreciate that the invention may be practiced with other computer system configurations, including hand-held devices, multiprocessor systems, microprocessor-based or programmable consumer electronics, network PCs, minicomputers, mainframe computers, and the like. The invention may also be practiced in distributed computing environments where tasks are performed by remote processing devices that are linked through a communications network. In a distributed computing environment, program modules may be located on both local and remote memory storage devices.

With reference to FIG. 1, an exemplary system for implementing the invention includes a general purpose computing device in the form of a conventional personal computer 100, including a processing unit 102, a system memory 104, and a system bus 106 that couples various system components including the system memory 104 to the processing unit 102. The system bus 106 may be any of several types of bus structures including a memory bus or memory controller, a peripheral bus, and a local bus using any of a variety of bus architectures. The system memory includes read only memory (ROM) 110 and random access memory (RAM) 112. A basic input/output system 114 (BIOS), containing the basic routines that helps to transfer information between elements within the personal computer 100, such as during start-up, is stored in ROM 110. The personal computer 100 further includes a hard disk drive 116 for reading from and writing to a hard disk, not shown, a magnetic disk drive 118 for reading from or writing to a removable magnetic disk 120, and an optical disk drive 122 for reading from or writing to a removable optical disk 124 such as a CD ROM or other optical media. The hard disk drive 116, magnetic disk drive 128, and optical disk drive 122 are connected to the system bus 106 by a hard disk drive interface 126, a magnetic disk drive interface 128, and an optical drive interface 130, respectively. The drives and their associated computer-readable media provide nonvolatile storage of computer readable instructions, data structures, program modules and other data for the personal computer 100. Although the exemplary environment described herein employs a hard disk, a removable magnetic disk 120 and a removable optical disk 124, it should be appreciated by those skilled in the art that other types of computer readable media which can store data that is accessible by a computer, such as magnetic cassettes, flash memory cards, digital video disks, Bernoulli cartridges, random access memories (RAMs), read only memories (ROM), and the like, may also be used in the exemplary operating environment.

A number of program modules may be stored on the hard disk, magnetic disk 120, optical disk 124, ROM 110 or RAM 112, including an operating system 132, one or more application programs 134, other program modules 136, and program data 138. A user may enter commands and information into the personal computer 100 through input devices such as a keyboard 140 and pointing device 142. Other input devices (not shown) may include a microphone, joystick, game pad, satellite dish, scanner, or the like. These and other input devices are often connected to the processing unit 102 through a serial port interface 144 that is coupled to the system bus 106, but may be connected by other interfaces, such as a parallel port, game port or a universal serial bus (USB). A monitor 146 or other type of display device is also connected to the system bus 106 via an interface, such as a video adapter 148. In addition to the monitor 146, personal computers typically include other peripheral output devices (not shown), such as speakers and printers.

The personal computer 100 may operate in a networked environment using logical connections to one or more remote computers, such as a remote computer 150. The remote computer 150 may be another personal computer, a server, a router, a network PC, a peer device or other common network node, and typically includes many or all of the elements described above relative to the personal computer 100, although only a memory storage device 152 has been illustrated in FIG. 1. The logical connections depicted in FIG. 1 include a local area network (LAN) 154 and a wide area network (WAN) 156. Such networking environments are commonplace in offices, enterprise-wide computer networks, intranets and Internet.

When used in a LAN networking environment, the personal computer 100 is connected to the local network 154 through a network interface or adapter 158. When used in a WAN networking environment, the personal computer 100 typically includes a modem 160 or other means for establishing communications over the wide area network 156, such as the Internet. The modem 160, which may be internal or external, is connected to the system bus 106 via the serial port interface 144. In a networked environment, program modules depicted relative to the personal computer 100, or portions thereof, may be stored in the remote memory storage device. It will be appreciated that the network connections shown are exemplary and other means of establishing a communications link between the computers may be used.

General Overview

Figure 2:
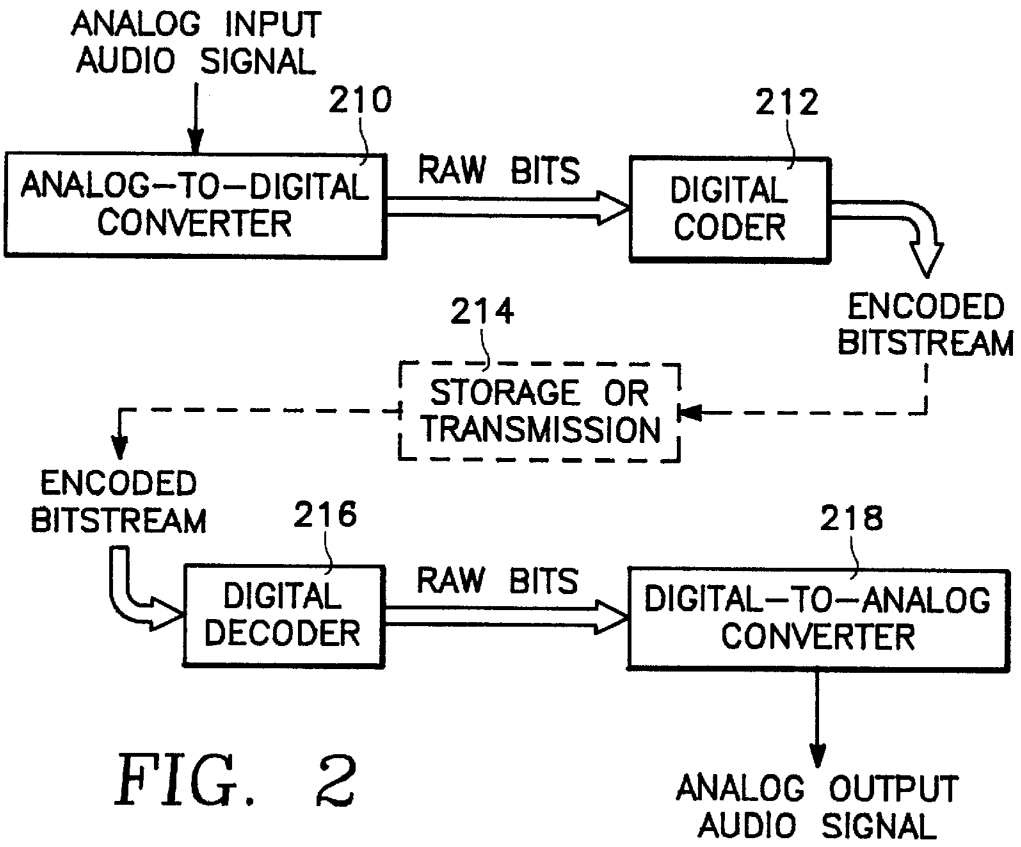
FIG. 2 is a general block/flow diagram illustrating a system and method for encoding/decoding an audio signal in accordance with the present invention.

FIG. 2 is a general block/flow diagram illustrating a system and method for encoding/decoding an audio signal in accordance with the present invention. First, an analog audio input signal of a source is received and processed by an analog-to-digital (A/D) converter 210. The A/D converter 210 produces raw data bits. The raw data bits are sent to a digital coder 212 and processed to produce an encoded bitstream in accordance with the present invention (a detailed description of the coder is provided below). The encoded bitstream is utilized, stored, transferred, etc. (box 214) and then sent to a digital decoder 216 and processed to reproduce the original raw data bits. A digital-to-analog (D/A) converter 218 receives the raw data bits for conversion into an output audio signal. The produced output audio signal substantially matches the input audio signal.

Figure 3:
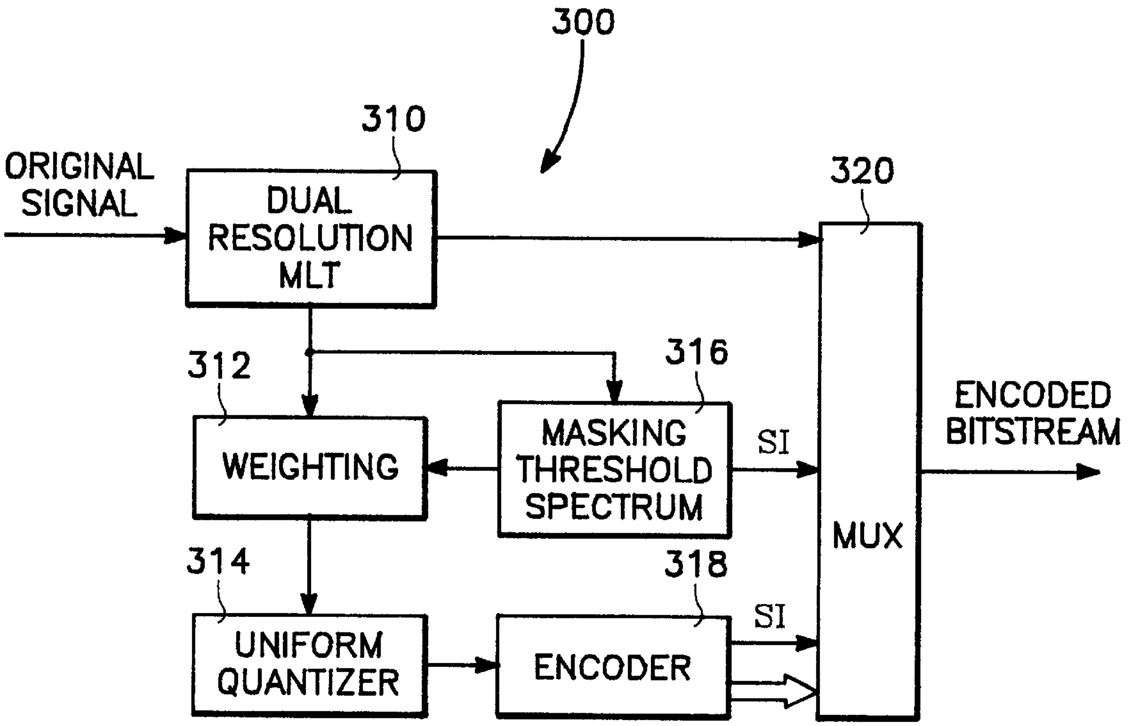
FIG. 3 is an overview architectural block diagram illustrating a system for encoding audio signals in accordance with the present invention.

FIG. 3 is an overview architectural block diagram illustrating a system for coding audio signals in accordance with the present invention. The coder 300 (coder 212 of FIG. 2) of the present invention includes a multi-resolution transform processor 310, a weighting processor 312, a uniform quantizer 314, a masking threshold spectrum processor 316, an encoder 318, and a communication device 320.

The multi-resolution transform processor 310 is preferably a dual resolution modulated lapped transform (MLT) transform processor. The transform processor receives the original signal and produces transform coefficients from the original signal. The weighting processor 312 and the masking threshold spectrum processor 316 perform spectral weighting and partial whitening for masking as much quantization noise as possible. The uniform quantizer 314 is for converting continuous values to discrete values. The encoder 318 is preferably an entropy encoder for encoding the transform coefficients. The communication device 320 is preferably a multiplexor (MUX) for multiplexing (combining) signals received from the above components for transmission over a single medium.

The decoder (not shown) comprises inverse components of the coder 300, such as an inverse multi-resolution transform processor (not shown), an inverse weighting processor (not shown), an inverse uniform quantizer (not shown), an inverse masking threshold spectrum processor (not shown), an inverse encoder (not shown), and an inverse MUX (not shown).

Component Overview

Figure 4:
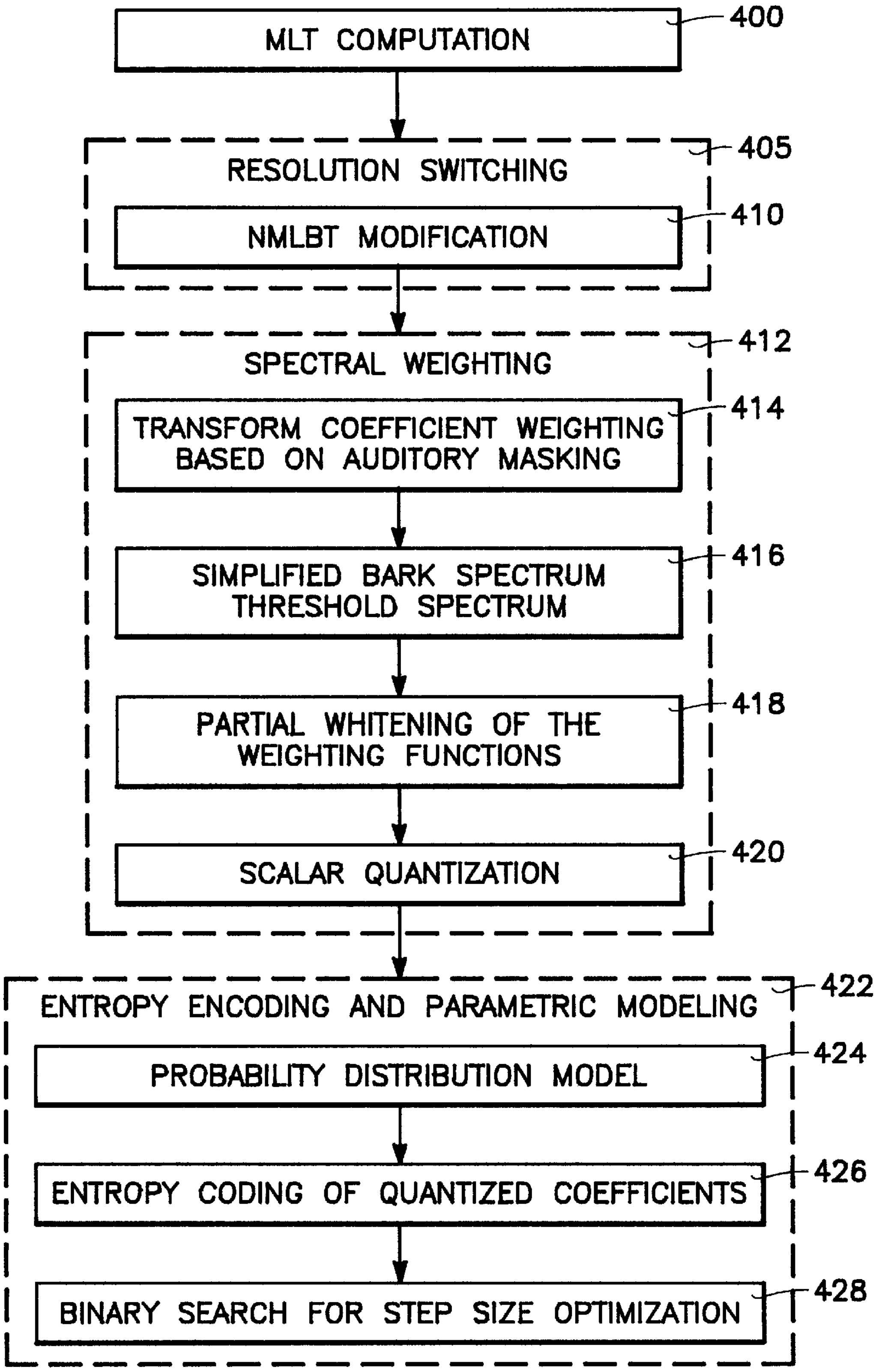
FIG. 4 is an overview flow diagram illustrating the method for encoding audio signals in accordance with the present invention.

FIG. 4 is an overview flow diagram illustrating the method for encoding audio signals in accordance with the present invention. Specific details of operation are discussed in FIGS. 7–16. In general, first, an MLT computation is performed (box 400) to produce transform coefficients followed by resolution switching (box 405) of modified MLT coefficients (box 410). Resolution switching is used to improve the performance for transient signals.

Second, spectral weighting is performed (box 412) by: a) weighting the transform coefficients based on auditory masking techniques of the present invention described below (box 414); b) computing a simplified Bark threshold spectrum (box 416); c) performing partial whitening of the weighting functions (box 418); and d) performing scalar quantization (box 420). Spectral weighting is performed in accordance with the present invention to mask as much quantization noise as possible to produce a reconstructed signal that is as close as possible to being perceptually transparent.

Third, encoding and parametric modeling (box 422) is performed by creating a probability distribution model (box 424) that is utilized by an encoder, such as an entropy encoder for entropy encoding the quantized coefficients (box 426) and then performing a binary search for quantization step size optimization (box 428). Scalar quantization (box 420) converts floating point coefficients to quantized coefficients, which are given by the nearest value in a set of discrete numbers. The distance between the discrete values is equal to the step size. Entropy encoding and parametric modeling, among other things, improves the performance under clean speech conditions. Entropy encoding produces an average amount of information represented by a symbol in a message and is a function of a probability model (parametric modeling) used to produce that message. The complexity of the model is increased so that the model better reflects the actual distribution of source symbols in the original message to reduce the message. This technique enables improved encoding of the periodic spectral structure of voiced speech.

Figure 5:
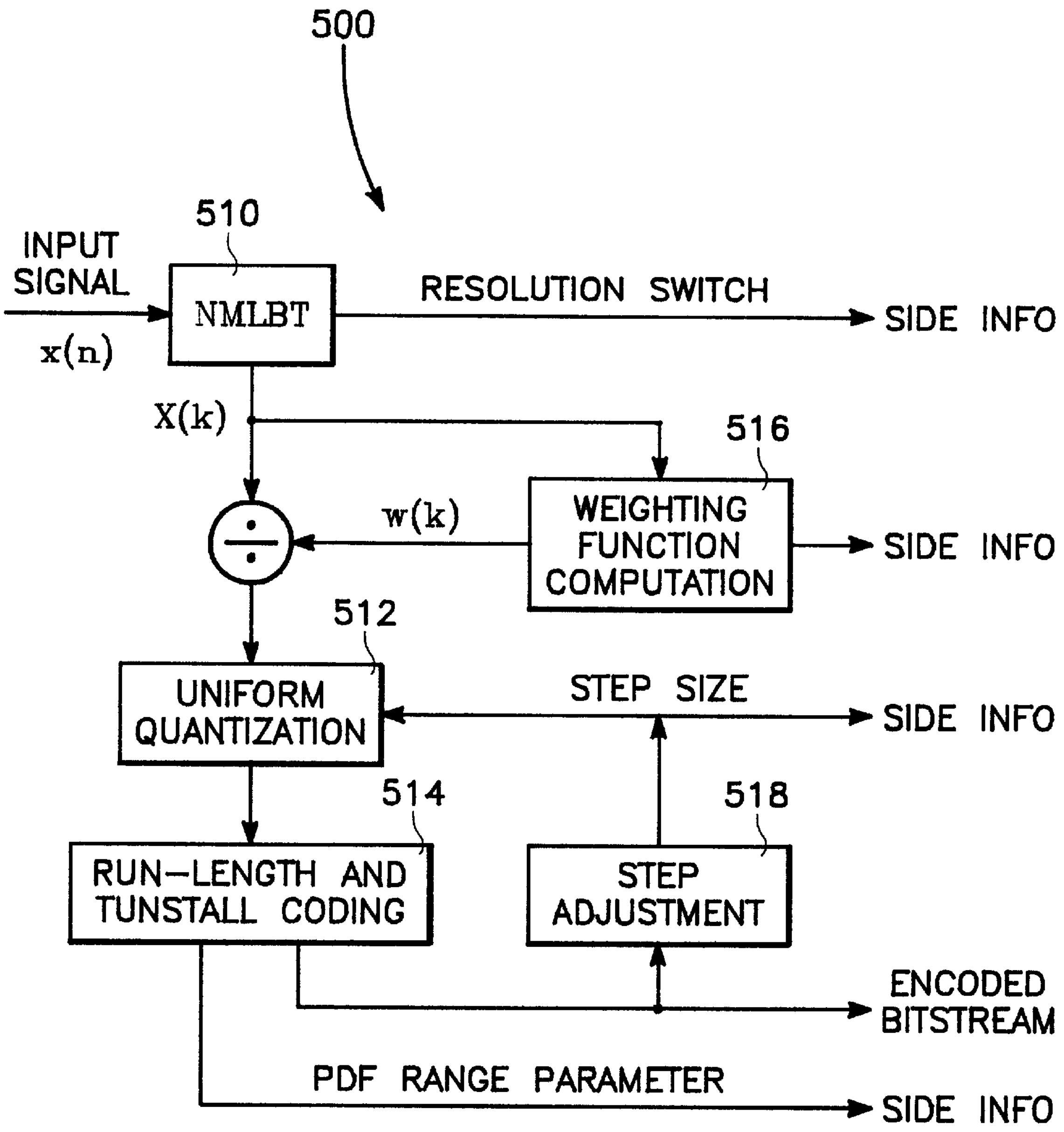
FIG. 5 is a general block/flow diagram illustrating a system for encoding audio signals in accordance with the present invention.
Figure 6:
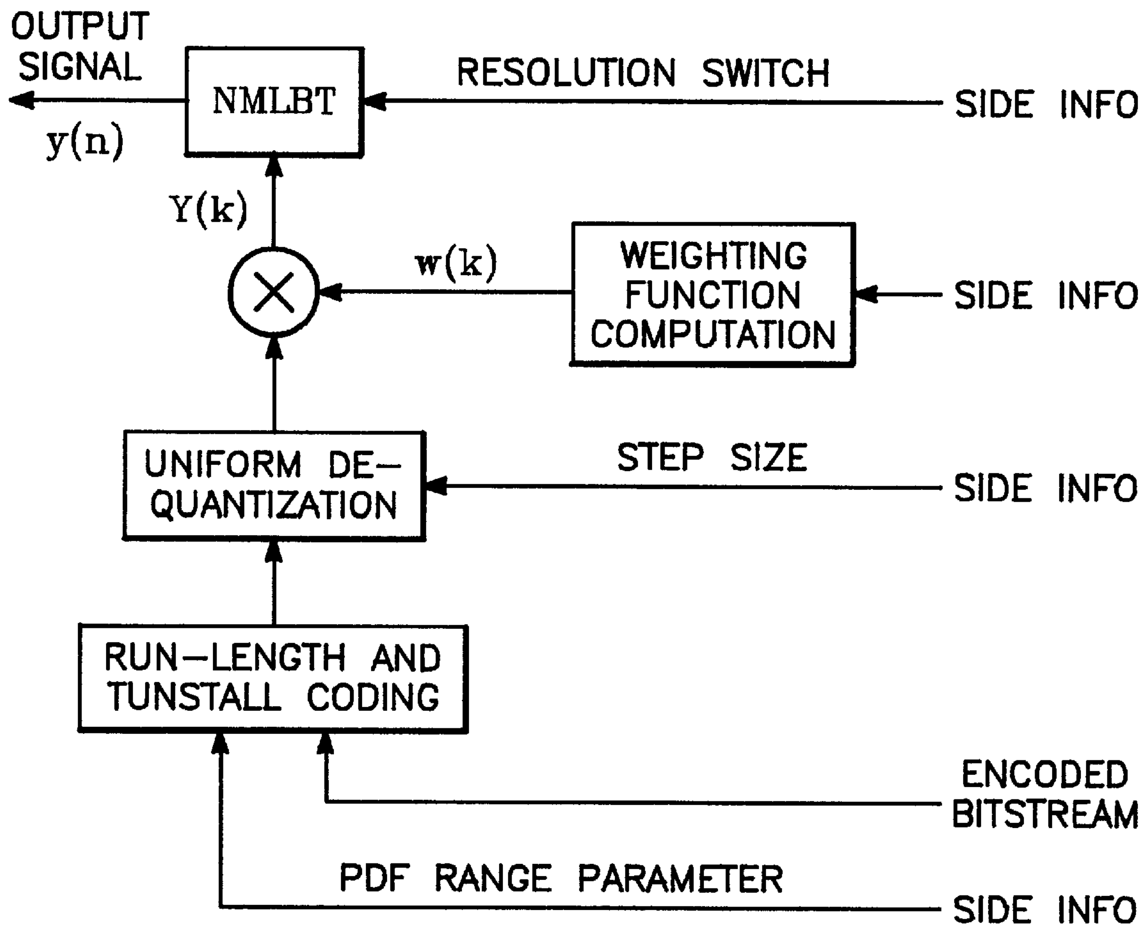
FIG. 6 is a general block/flow diagram illustrating a system for decoding audio signals in accordance with the present invention.

FIG. 5 is a general block/flow diagram illustrating a system for coding audio signals in accordance with the present invention. FIG. 6 is a general block/flow diagram illustrating a system for decoding audio signals in accordance with the present invention. In general, overlapping blocks of the input signal x(n) are transformed by a coder 500 into the frequency domain via a nonuniform modulated lapped biorthogonal transform (NMLBT) 510. The NMLBT 510 is essentially a modulated lapped transform (MLT) with different analysis and synthesis windows, in which high-frequency subbands are combined for better time resolution. Depending on the signal spectrum, the combination of high-frequency subbands may be switched on or off, and a one-bit flag is sent as side information to the decoder of FIG. 6. The NMLBT analysis and synthesis windows are not modified, as discussed below in detail.

The transform coefficients X(k) are quantized by uniform quantizers 512, as shown in FIG. 5. Uniform quantizers 512 are very close to being optimal, in a rate-distortion sense, if their outputs are entropy coded by, for example a run-length and Tunstall encoder 514 (described below in detail). Vector quantization (VQ) could be employed, but the gains in performance are minor, compared to the entropy encoder 514. Although TwinVQs or other structured VQs can be used to reduce complexity, they are still significantly more complex than scalar quantization.

An optimal rate allocation rule for minimum distortion at any given bit rate would assign the same step size for the subband/transform coefficients, generating white quantization noise. This leads to a maximum signal-to-noise ratio (SNR), but not the best perceptual quality. A weighting function computation 516 replaces X(k) by X(k)lw(k), prior to quantization, for $k=0, 1, \ldots, M-1$, where M is the number of subbands, usually a power of two between 256 and 1024. At the decoder of FIG. 6, the reconstructed transform coefficients by $\hat{X}(k) \leftarrow \hat{X}(k)w(k)$ are weighed. Thus, the quantization noise will follow the spectrum defined by the weighting function w(k). The sections below describe the detailed computations of w(k). The quantized transform coefficients are entropy encoded by the entropy encoder 514. Parametric modeling is performed and results are used by the entropy encoder 514 to increase the efficiency of the entropy encoder 514. Also, step adjustments 518 are made to the adjust step size.

The operation of the decoder of FIG. 6 can be inferred from FIG. 5. Besides the encoded bits corresponding to the quantized transform coefficients, the decoder of FIG. 6 needs the side information shown in FIG. 5, so it can determine the entropy decoding tables, the quantization step size, the weighting function w(k), and the single/multi-resolution flag for the inverse NMLBT.

Component Details and Operation:

Referring back to FIG. 3 along with FIG. 5, the incoming audio signal is decomposed into frequency components by a transform processor, such as a lapped transform processor. This is because although other transform processors, such as discrete cosine transforms (DCT and DCT-IV) are useful tools for frequency-domain signal decomposition, they suffer from blocking artifacts. For example, transform coefficients X(k) are processed by DCT and DCT-IV transform processors in some desired way: quantization, filtering, noise reduction, etc.

Figure 7:
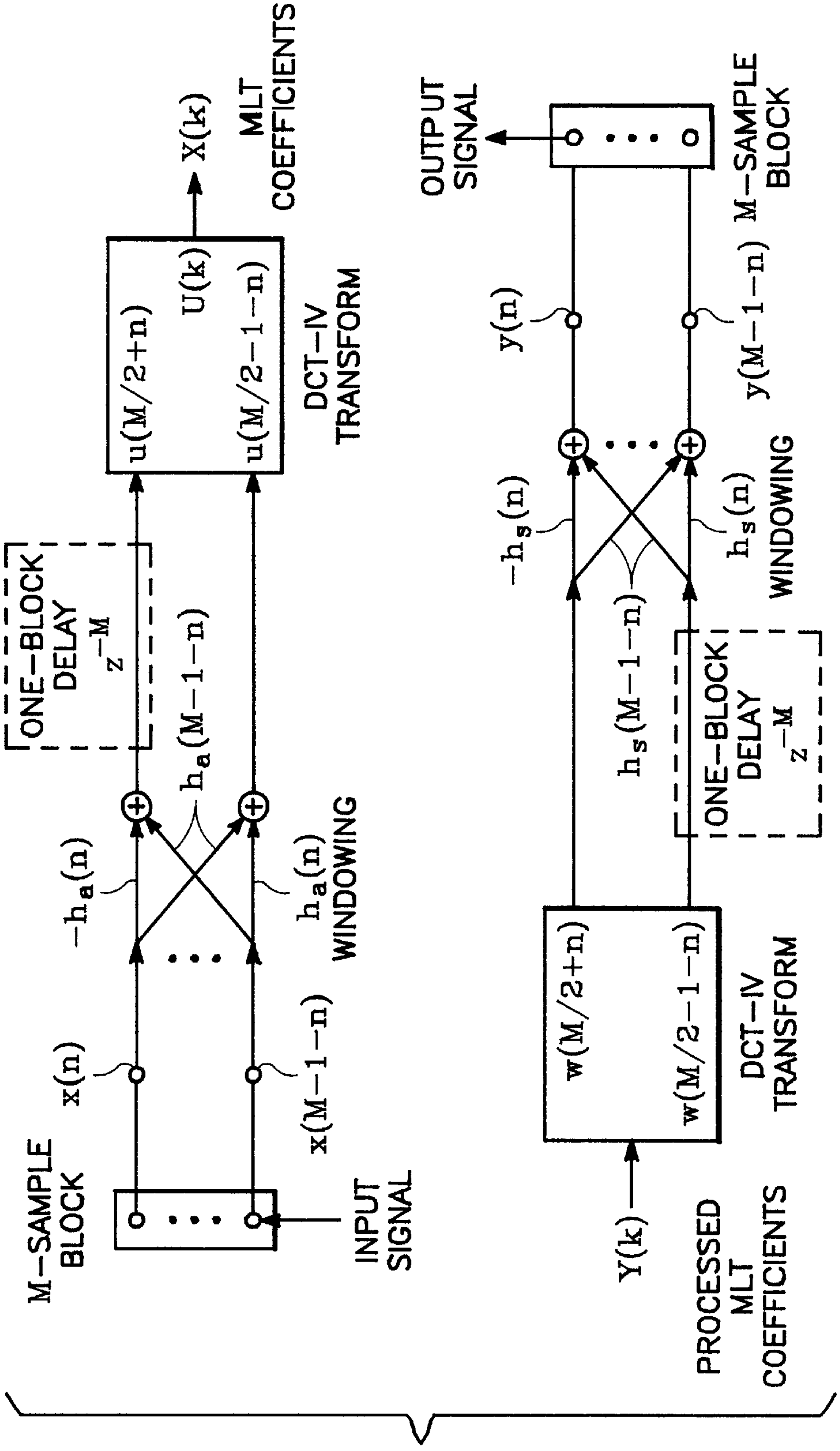
FIG. 7 is a flow diagram illustrating a modulated lapped transform in accordance with the present invention.

Reconstructed signal blocks are obtained by applying the inverse transform to such modified coefficients. When such reconstructed signal blocks are pasted together to form the reconstructed signal (e.g. a decoded audio or video signal), there will be discontinuities at the block boundaries. In contrast, the modulated lapped transform (MLT) eliminates such discontinuities by extending the length of the basis functions to twice the block size, i.e. 2M. FIG. 7 is a flow diagram illustrating a modulated lapped transform in accordance with the present invention.

The basis functions of the MLT are obtained by extending the DCT-IV functions and multiplying them by an appropriate window, in the form:

$$a_{nk} = h(n)\cos\left[\left(n + \frac{M+1}{2}\right)\left(k + \frac{1}{2}\right)\frac{\pi}{M}\right]$$

where k varies from 0 to M−1, but n now varies from 0 to 2M−1.

Thus, MLTs are preferably used because they can lead to orthogonal or biorthogonal basis and can achieve short-time decomposition of signals as a superposition of overlapping windowed cosine functions. Such functions provide a more efficient tool for localized frequency decomposition of signals than the DCT or DCT-IV. The MLT is a particular form of a cosine-modulated filter bank that allows for perfect reconstruction. For example, a signal can be recovered exactly from its MLT coefficients. Also, the MLT does not have blocking artifacts, namely, the MLT provides a reconstructed signal that decays smoothly to zero at its boundaries, avoiding discontinuities along block boundaries. In addition, the MLT has almost optimal performance, in a rate/distortion sense, for transform coding of a wide variety of signals.

Specifically, the MLT is based on the oddly-stacked time-domain aliasing cancellation (TDAC) filter bank. In general, the standard MLT transformation for a vector containing 2M samples of an input signal x(n), n=0, 1, 2, . . . , 2M−1 (which are determined by shifting in the latest M samples of the input signal, and combining them with the previously acquired M samples), is transformed into another vector containing M coefficients X(k), k=0, 1, 2, . . . , M−1. The transformation can be redefined by a standard MLT computation:

$$X(k) \equiv \sqrt{\frac{2}{M}}\sum_{n=0}^{2M-1} x(n)h(n)\cos\left[\left(n + \frac{M+1}{2}\right)\left(k + \frac{1}{2}\right)\frac{\pi}{M}\right]$$

where h(n) is the MLT window.

Window functions are primarily employed for reducing blocking effects. For example, *Signal Processing with Lapped Transforms*, by H. S. Malvar, Boston: Artech House, 1992, which is herein incorporated by reference, demonstrates obtaining its basis functions by cosine modulation of smooth window operators, in the form:

$$p_a(n,k) = h_a(n)\sqrt{\frac{2}{M}}\cos\left[\left(n + \frac{M+1}{2}\right)\left(k + \frac{1}{2}\right)\frac{\pi}{M}\right] \quad (1)$$

$$p_s(n,k) = h_s(n)\sqrt{\frac{2}{M}}\cos\left[\left(n + \frac{M+1}{2}\right)\left(k + \frac{1}{2}\right)\frac{\pi}{M}\right]$$

where $p_a(n,k)$ and $p_s(n,k)$ are the basis functions for the direct (analysis) and inverse (synthesis) transforms, and $h_a(n)$ and $h_s(n)$ are the analysis and synthesis windows, respectively. The time index n varies from 0 to 2M−1 and the frequency index k varies from 0 to M−1, where M is the block size. The MLT is the TDAC for which the windows generate a lapped transform with maximum DC concentration, that is:

$$h_a(n) = h_s(n) = \sin\left[\left(n + \frac{1}{2}\right)\frac{\pi}{2M}\right] \quad (2)$$

The direct transform matrix $P_a$ has an entry in the n-th row and k-th column of $p_a(n,k)$. Similarly, the inverse transform matrix $P_s$ has entries $p_s(n,k)$. For a block x of 2M input samples of a signal x(n), its corresponding vector X of transform coefficients is computed by $X=P_a^T x$. For a vector Y of processed transform coefficients, the reconstructed 2M-sample vector y is given by $y=P_s Y$. Reconstructed y vectors are superimposed with M-sample overlap, generating the reconstructed signal y(n).

The MLT can be compared with the DCT-IV. For a signal u(n), its length-M orthogonal DCT-IV is defined by:

$$U(k) \equiv \sqrt{\frac{2}{M}}\sum_{n=0}^{M-1} u(n)\cos\left[\left(n + \frac{1}{2}\right)\left(k + \frac{1}{2}\right)\frac{\pi}{M}\right] \quad (3)$$

The frequencies of the cosine functions that form the DCT-IV basis are (k+½)π/M, the same as those of the MLT. Therefore, a simple relationship between the two transforms exists. For instance, for a signal x(n) with MLT coefficients X(k), it can be shown that X(k)=U(k) if u(n) is related to x(n), for n=0,1, . . . , M/2−1, by:

$$u(n+M/2)=\Delta_M\{x(M-1-n)h_a(M-1-n)-x(n)h_a(n)\}$$

$$u(M/2-1-n)=x(M-1-n)h_a(n)+x(n)h_a(M-1-n)$$

where $\Delta_M\{\cdot\}$ is the M-sample (one block) delay operator. For illustrative purposes, by combining a DCT-IV with the above, the MLT can be computed from a standard DCT-IV. An inverse MLT can be obtained in a similar way. For example, if Y(k)=X(k), i.e., without any modification of the transform coefficients (or subband signals), then cascading the direct and inverse MLT processed signals leads to y(n)=x(n−2M), where M samples of delay come from the blocking operators and another M samples come from the internal overlapping operators of the MLT (the $z^{-M}$ operators).

Modulated Lapped Biorthogonal Transforms

In the present invention, the actual preferred transform is a modulated lapped biorthogonal transform (MLBT). FIG. 7 is a flow diagram illustrating a modulated lapped biorthogonal transform in accordance with the present invention. The MLBT is a variant of the modulated lapped transform (MLT). Like the MLT, the MLBT window length is twice the block size, it leads to maximum coding gain, but its shape is slightly modified with respect to the original MLT sine window. To generate biorthogonal MLTs within the formulation in Eqn. (1), the constraint of identical analysis and synthesis windows needs to be relaxed. Assuming a symmetrical synthesis window, and applying biorthogonality conditions to Eqn. (1), Eqn. (1) generates a modulated lapped biorthogonal transform (MLBT) if the analysis window satisfies generalized conditions:

$$h_a(n) = \frac{h_s(n)}{h_s^2(n) + h_s^2(n+M)}, n = 0, 1, \ldots, M-1 \tag{4}$$

and $h_a(n)=h_a(2M-1-n)$.

The windows can be optimized for maximum transform coding gain with the result that the optimal windows converges to the MLT window of Eqn. (2). This allows the MBLT to improve the frequency selectivity of the synthesis basis functions responses and be used as a building block for nonuniform MLTs (discussed in detail below). The MLBT can be defined as the modulated lapped transform of Eqn. (1) with the synthesis window $$h_s(n) = \frac{1 - \cos\left[\left(\frac{n+1}{2M}\right)^{\alpha}\pi\right] + \beta}{2+\beta}, n = 0, 1, \ldots, M-1 \tag{5}$$

and the analysis window defined by Eqn. (4).

The parameter α controls mainly the width of the window, whereas β controls its end values. The main advantage of the MLBT over the MLT is an increase of the stopband attenuation of the synthesis functions, at the expense of a reduction in the stopband attenuation of the analysis functions.

NMLBT And Resolution Switching

The number of subbands M of typical transform coders has to be large enough to provide adequate frequency resolution, which usually leads to block sizes in the 20–80 ms range. That leads to a poor response to transient signals, with noise patterns that last the entire block, including pre-echo. During such transient signals a fine frequency resolution is not needed, and therefore one way to alleviate the problem is to use a smaller M for such sounds. Switching the block size for a modulated lapped transform is not difficult but may introduce additional encoding delay. An alternative approach is to use a hierarchical transform or a tree-structured filter bank, similar to a discrete wavelet transform. Such decomposition achieves a new nonuniform subband structure, with small block sizes for the high-frequency subbands and large block sizes for the low-frequency subbands. Hierarchical (or cascaded) transforms have a perfect time-domain separation across blocks, but a poor frequency-domain separation. For example, if a QMF filter bank is followed by a MLTs on the subbands, the subbands residing near the QMF transition bands may have stopband rejections as low as 10 dB, a problem that also happens with tree-structured transforms.

An alternative and preferred method of creating a new nonuniform transform structure to reduce the ringing artifacts of the MLT/MLTBT can be achieved by modifying the time-frequency resolution. Modification of the time-frequency resolution of the transform can be achieved by applying an additional transform operator to sets of transform coefficients to produce a new combination of transform coefficients, which generates a particular nonuniform MLBT (NMLBT). FIG. 7 is a simplified block diagram illustrating a nonuniform modulated lapped biorthogonal transform in accordance with the present invention.

Figure 8:
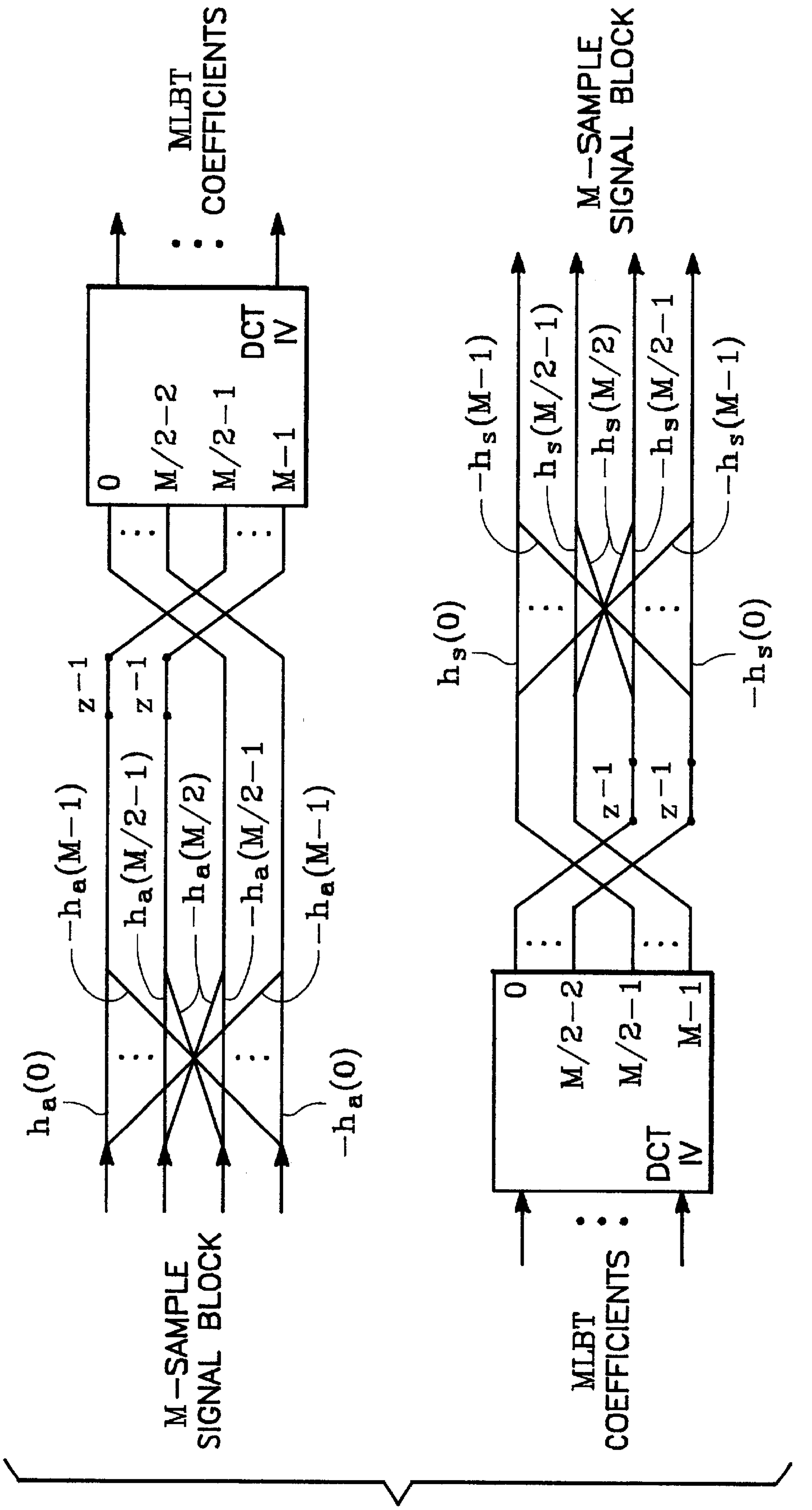
FIG. 8 is a flow diagram illustrating a modulated lapped biorthogonal transform in accordance with the present invention.
Figure 9:
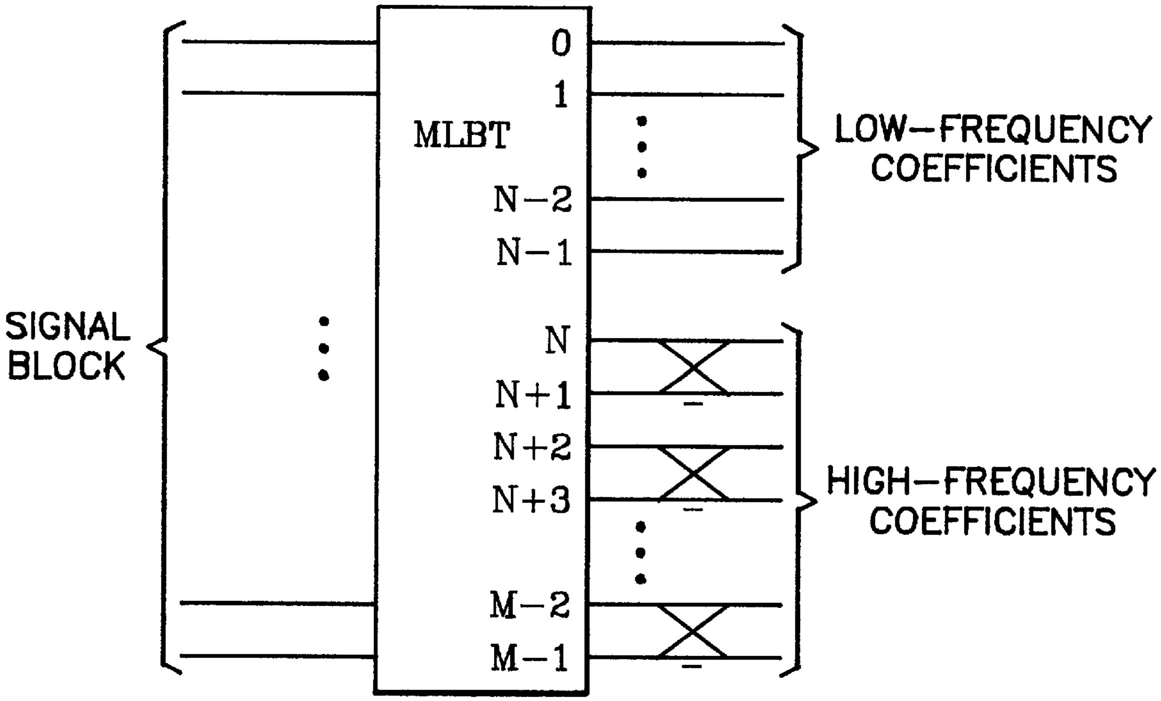
FIG. 9 is a simplified block diagram illustrating a nonuniform modulated lapped biorthogonal transform in accordance with the present invention.

FIG. 8 is a simplified block diagram illustrating operation of a nonuniform modulated lapped biorthogonal transform in accordance with the present invention. Specifically, a nonuniform MBLT can be generated by linearly combining some of the subband coefficients X(k), and new subbands whose filters have impulse responses with reduced time width. One example is:

$$X'(2r)=X(2r)+X(2r+1)$$

$$X'(2r+1)=X(2r)-X(2r+1)$$

where the subband signals X(2r) and X(2r+1), which are centered at frequencies (2r+½)π/M and (2r+3/2)π/M, are combined to generate two new subband signals X'(2r) and X'(2r+1). These two new subband signals are both centered at (r+1)π/M, but one has an impulse response centered to the left of the block, while the other has an impulse response centered at the right of the block. Therefore, we lose frequency resolution to gain time resolution. FIG. 9 illustrates one example of nonuniform modulated lapped biorthogonal transform synthesis basis functions.

The main advantage of this approach of resolution switching by combining transform coefficients is that new subband signals with narrower time resolution can be computed after the MLT of the input signal has been computed. Therefore, there is no need to switch the MLT window functions or block size M. It also allows signal enhancement operators, such as noise reducers or echo cancelers, to operate on the original transform/subband coefficients, prior to the subband merging operator. That allows for efficient integration of such signal enhancers into the codec.

Figure 10:
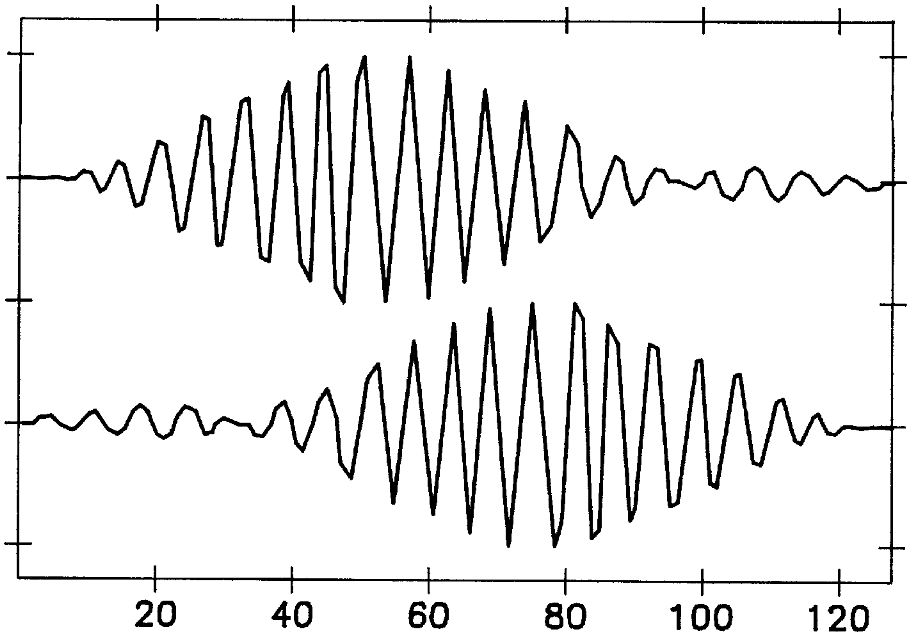
FIG. 10 illustrates one example of nonuniform modulated lapped biorthogonal transform synthesis basis functions.
Figure 11:
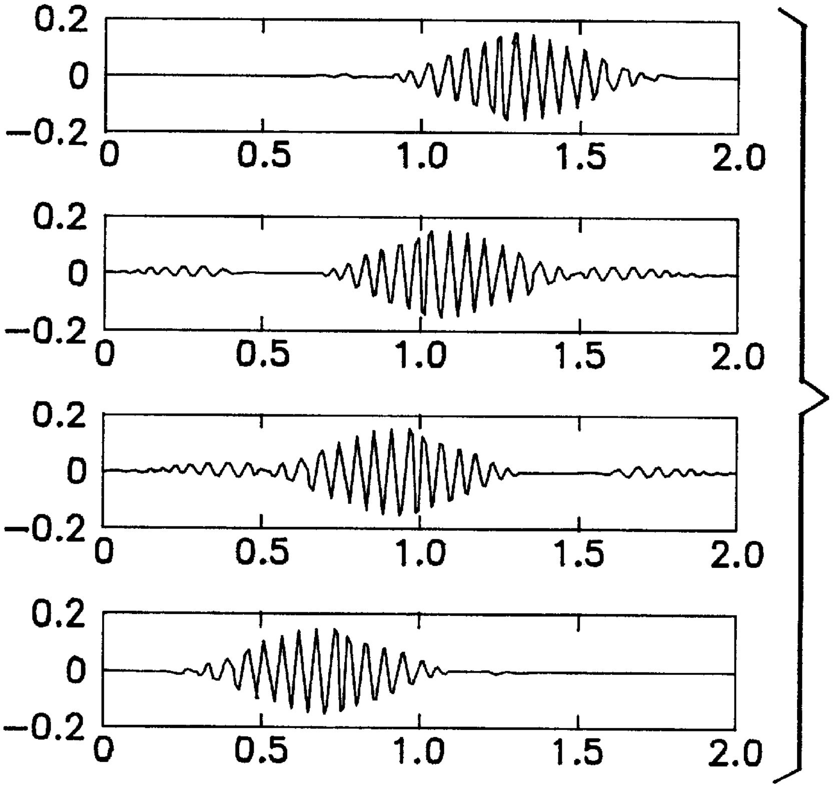
FIG. 11 illustrates another example of nonuniform modulated lapped biorthogonal transform synthesis basis functions.

Alternatively, and preferably, better results can be achieved if the time resolution is improved by a factor of four. That leads to subband filter impulse responses with effective widths of a quarter block size, with the construction:

$$\begin{bmatrix} X'(4r) \\ X'(4r+1) \\ X'(4r+2) \\ X'(4r+3) \end{bmatrix} = \begin{bmatrix} a & a & a & a \\ b & c & -c & -b \\ -b & c & c & -b \\ -a & a & -a & a \end{bmatrix} \begin{bmatrix} X(4r) \\ X(4r+1) \\ X(4r+2) \\ X(4r+3) \end{bmatrix}$$

where a particularly good choice for the parameters is a=05412, b=$\sqrt{1/2}$, c=$a^2$, r=$M_0$, $M_0$+1, . . . , and $M_0$ typically set to M/16 (that means resolution switching is applied to 75% of the subbands—from frequencies 0.25π to π). FIGS. 10 and 11 show plots of the synthesis basis functions corresponding to the construction. It can be seen that the time separation is not perfect, but it does lead to a reduction of error spreading for transient signals.

Automatic switching of the above subband combination matrix can be done at the encoder by analyzing the input block waveform. If the power levels within the block vary considerably, the combination matrix is turned on. The switching flag is sent to the receiver as side information, so it can use the inverse 4×4 operator to recover the MLT coefficients. An alternative switching method is to analyze the power distribution among the MLT coefficients X(k) and to switch the combination matrix on when a high-frequency noise-like pattern is detected.

Figure 12:
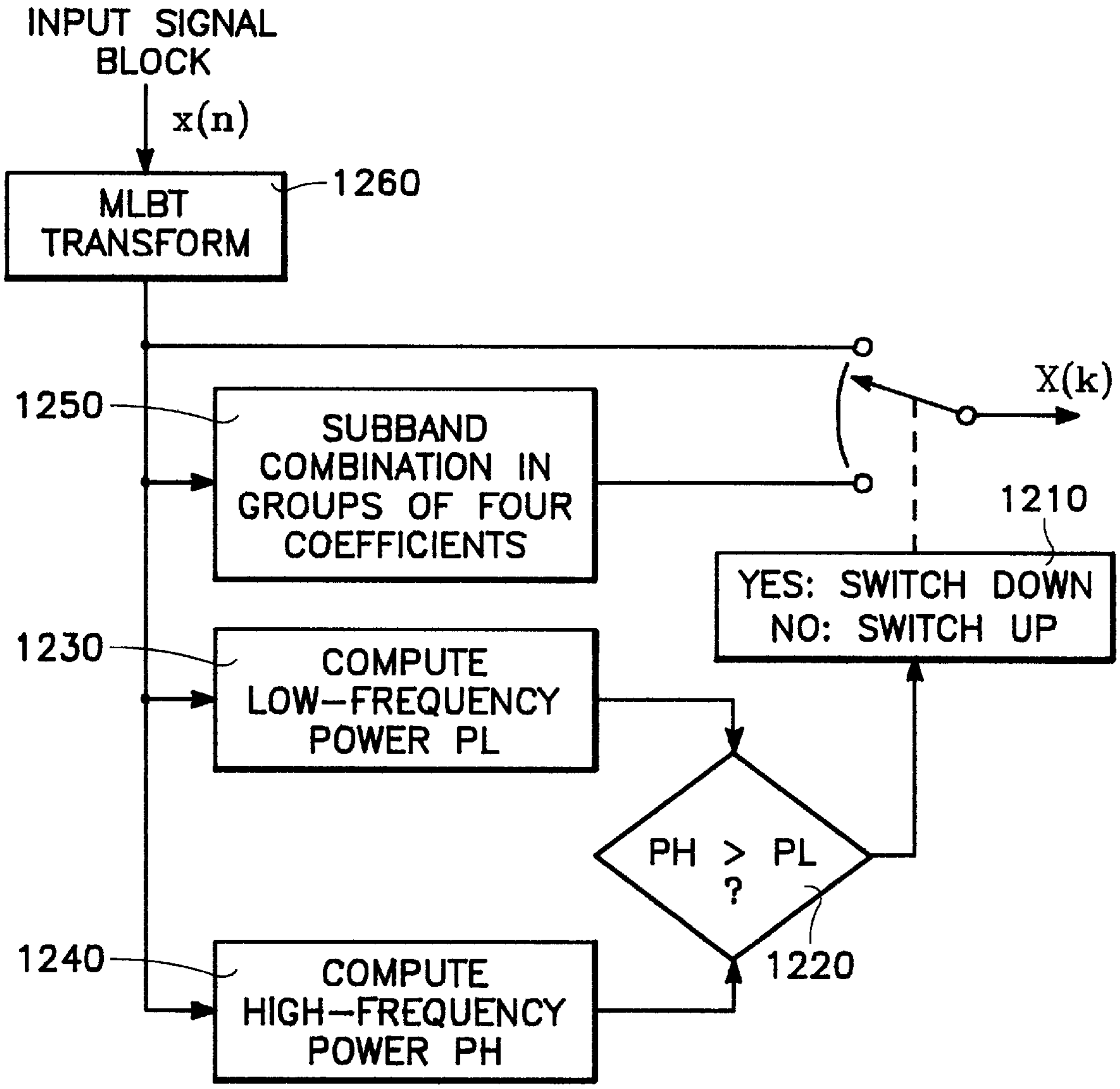
FIG. 12 is a flow diagram illustrating a system and method for performing resolution switching in accordance with the present invention.

FIG. 12 is a flow diagram illustrating the preferred system and method for performing resolution switching in accordance with the present invention. As shown in FIG. 12, resolution switching is decided at each block, and one bit of side information is sent to the decoder to inform if the switch is ON or OFF. In the preferred implementation, the encoder turns the switch ON box 1220 when the high-frequency energy for a given block exceeds the low-frequency energy by a predetermined threshold box 1220. Basically, the encoder controls the resolution switch by measuring the signal power at low and high frequencies. If the ratio of the high-frequency boxes 1230 and 1240, respectively power (PH) to the low-frequency power (PL) exceeds a predetermined threshold, the subband combination matrix of box 1250 is applied, as shown in FIG. 12.

Spectral Weighting

Figure 13:
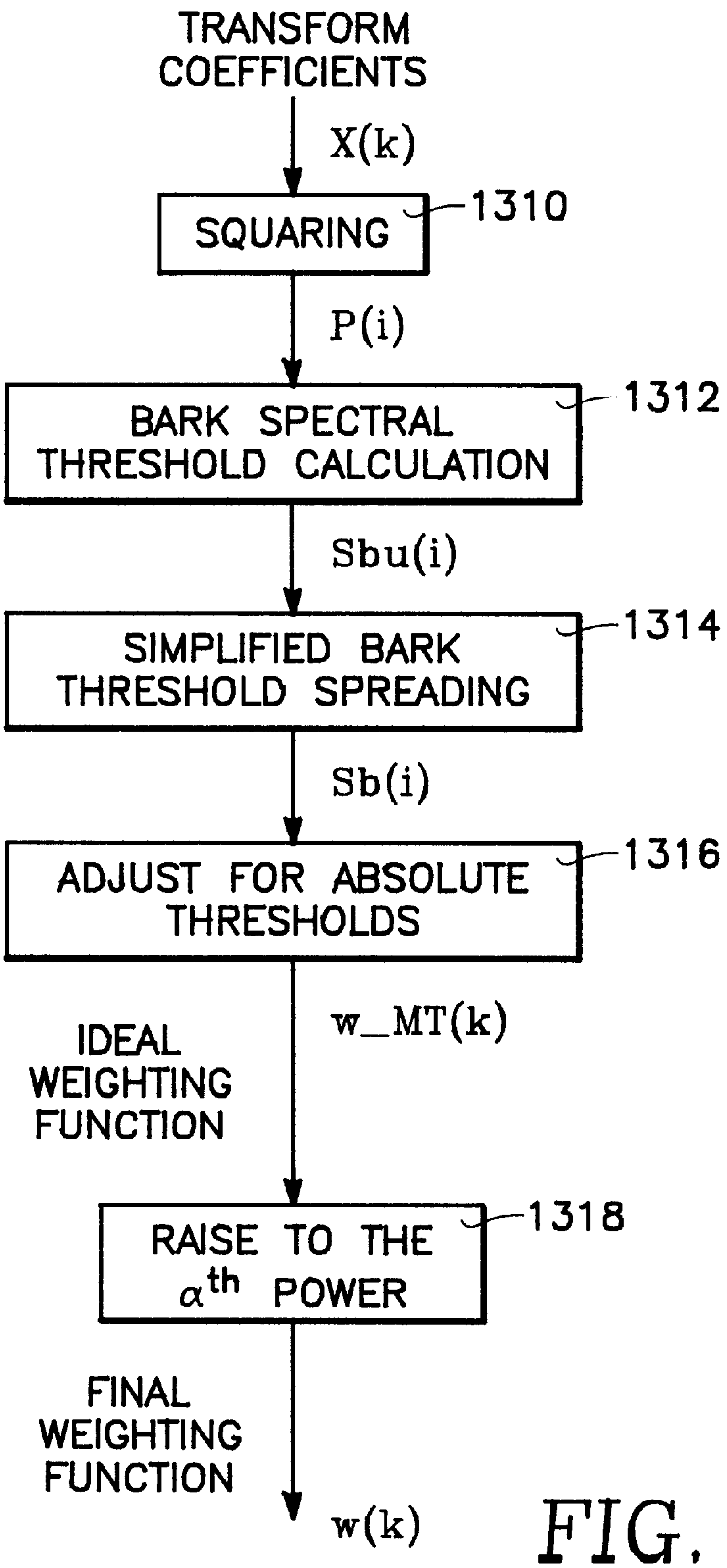
FIG. 13 is a flow diagram illustrating a system and method for performing weighting function calculations with partial whitening in accordance with the present invention.

FIG. 13 is a flow diagram illustrating a system and method for performing weighting function calculations with partial whitening in accordance with the present invention. Referring back to FIGS. 3 and 5 along with FIG. 13, a simplified technique for performing spectral weighting is shown. Spectral weighting, in accordance with the present invention can be performed to mask as much quantization noise as possible to produce a reconstructed signal that is as close as possible to being perceptually transparent, i.e., the decoded signal is indistinguishable from the original. This can be accomplished by weighting the transform coefficients by a function w(k) that relies on masking properties of the human ear. Such weighting purports to shape the quantization noise to be minimally perceived by the human ear, and thus, mask the quantization noise. Also, the auditory weighting function computations are simplified to avoid the time-consuming convolutions that are usually employed.

The weighting function w(k) ideally follows an auditory masking threshold curve for a given input spectrum $\{X(k)\}$. The masking threshold is preferably computed in a Bark scale. A Bark scale is a quasi-logarithmic scale that approximates the critical bands of the human ear. At high coding rates, e.g. 3 bits per sample, the resulting quantization noise can be below the quantization threshold for all Bark subbands to produce the perceptually transparent reconstruction. However, at lower coding rates, e.g. 1 bit/sample, it is difficult to hide all quantization noise under the masking thresholds. In that case, it is preferred to prevent the quantization noise from being raised above the masking threshold by the same decibel (dB) amount in all subbands, since low-frequency unmasked noise is usually more objectionable. This can be accomplished by replacing the original weighting function w(k) with a new function $w(k)^{\alpha}$, where $\alpha$ is a parameter usually set to a value less than one, to create partial whitening of the weighting function.

In general, referring to FIG. 13 along with FIGS. 3, 4 and 5, FIG. 13 illustrates a simplified computation of the hearing threshold curves, with a partial whitening effect for computing the step sizes. FIG. 13 is a detailed block diagram of boxes 312 and 316 of FIG. 3, boxes 414, 416, 418 of FIG. 4 and boxes 516 of FIG. 5. Referring to FIG. 13, after the MLT computation and the NMLBT modification, the transform coefficients X(k) are first received by a squaring module for squaring the transform coefficients (box 1310). Next, a threshold module calculates a Bark spectral threshold (box 1312) that is used by a spread module for performing Bark threshold spreading (box 1314) and to produce auditory thresholds. An adjust module then adjusts the auditory thresholds for absolute thresholds to produce an ideal weighting function (box 1316).

Last, a partial whitening effect is performed so that the ideal weighting function is raised to the $\alpha^{th}$ power to produce a final weighting function (box 1318).

Specifically, the squaring module produces P(i), the instantaneous power at the ith band, which is received by the threshold module for computing the masking threshold $W_{MT}(k)$, (as shown by box 1310 of FIG. 13). This can be accomplished by initially defining the Bark spectrum upper frequency limits Bh(i), for i=1, 2, . . . , 25 (conventional mathematical devices can be used) so that the Bark subbands upper limits in Hz are:

Bh=[100 200 300 400 510 630 770 920 1080 1270 1480 1720 2000];

Bh=[Bh 2320 2700 3150 3700 4400 5300 6400 7700 9500 12000 15500 22200].

Next, the ith Bark spectral power Pas(i) is computed by averaging the signal power for all subbands that fall within the ith Bark band. The in-band masking threshold Tr(i) by Tr(i)=Pas(i−Rfac (all quantities in decibels, dB) are then computed. The parameter Rfac, which is preferably set to 7 dB, determines the in-band masking threshold level. This can be accomplished by a mathematical looping process to generate the Bark power spectrum and the Bark center thresholds.

Figure 14:
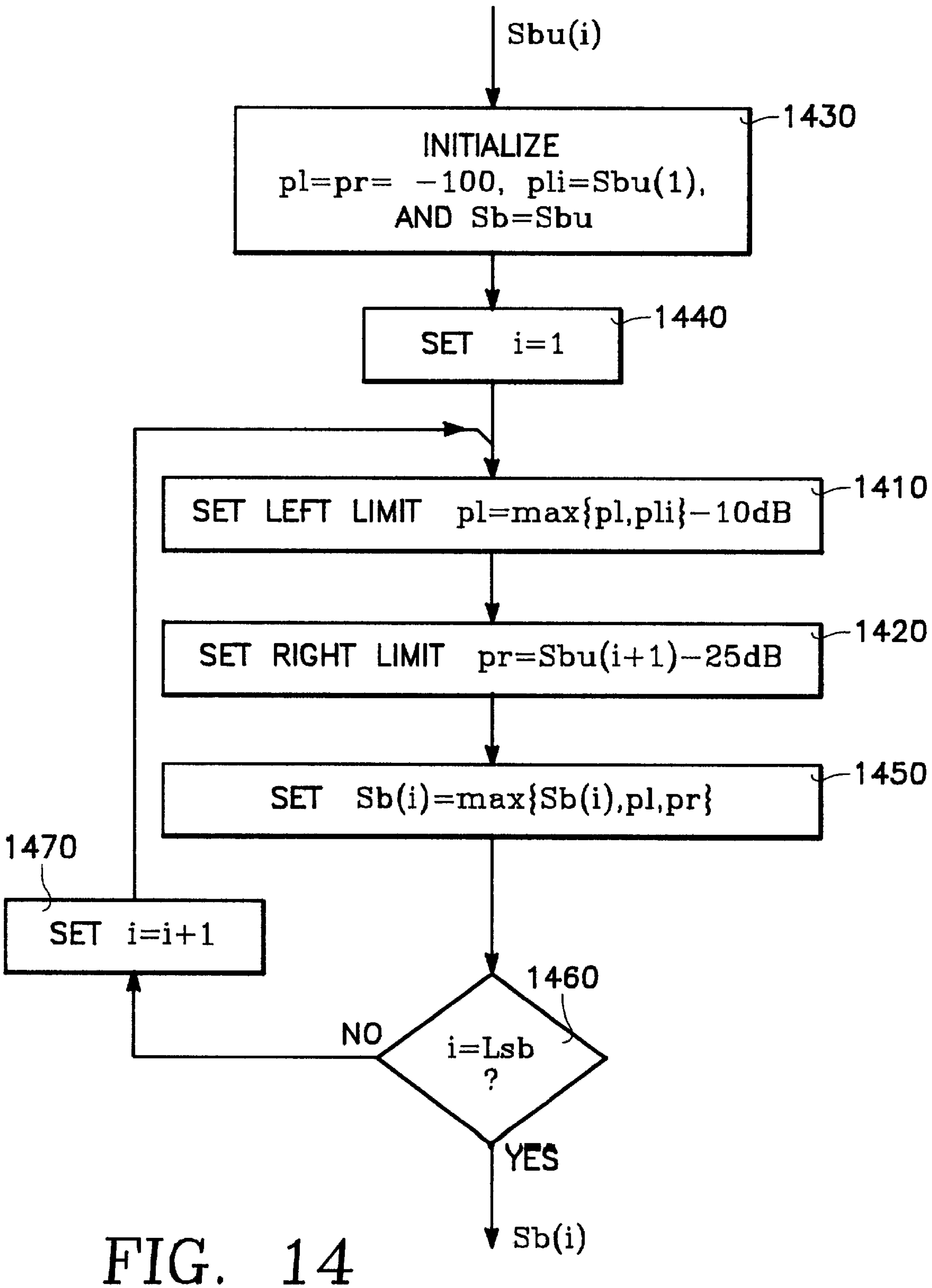
FIG. 14 is a flow diagram illustrating a system and method for performing a simplified Bark threshold computation in accordance with the present invention.

As shown by box 1314 of FIG. 13, a simplified Bark threshold spectrum is then computed. FIG. 14 illustrates a simplified Bark threshold computation in accordance with the present invention. Specifically, first, the spread Bark thresholds are computed by considering the lateral masking across critical bands. For instance, instead of performing a full convolution via a matrix operator, as proposed by previous methods, the present invention simply takes the maximum threshold curve from the one generated by convolving all Bark spectral values with a triangular decay. The triangular decay is −25 dB/Bark to the left box 1410 (spreading into lower frequencies) and +10 dB/Bark to the right box 1410 (spreading into higher frequencies). This method of the present invention for Bark spectrum threshold spreading has complexity O(Lsb), where Lsb is the number of Bark subbands covered by the signal bandwidth, whereas previous methods typically have a complexity $O(Lsb^2)$.

As shown by box 1316 of FIG. 13, the auditory thresholds are then adjusted by comparing the spread Bark thresholds with the absolute Fletcher-Munson thresholds and using the higher of the two, for all Bark subbands. This can be accomplished with a simple routine by, for example, adjusting thresholds considering absolute masking. In one routine, the vector of thresholds (up to 25 per block) is quantized to a predetermined precision level, typically set to 2.5 dB, and differentially encoded at 2 to 4 bits per threshold value.

With regard to partial whitening of the weighting functions, as shown by box 1318 of FIG. 13, at lower rates, e.g. 1 bit/sample, it is not possible to hide all quantization noise under the masking thresholds. In this particular case, it is not preferred to raise the quantization noise above the masking threshold by the same dB amount in all subbands, since low-frequency unmasked noise is usually more objectionable. Therefore, assuming $w_{MT}(k)$ is the weighting computed above, the coder of the present invention utilizes the final weights:

$$w(k)=[w_{MT}(k)]^{\alpha}$$

where $\alpha$ is a parameter that can be varied from 0.5 at low rates to 1 at high rates and a fractional power of the masking thresholds is preferably used. In previous perceptual coders, the quantization noise raises above the masking threshold equally at all frequencies, as the bit rate is reduced. In contrast, with the present invention, the partial-whitening parameter $\alpha$ can be set, for example, to a number between zero and one (preferably $\alpha$=0.5). This causes the noise spectrum to raise more at frequencies in which it would originally be smaller. In other words, noise spectral peaks are attenuated when $\alpha<1$.

Next, the amount of side information for representing the w(k)'s depends on the sampling frequency, $f_s$. For example, for $f_s$=8 kHz, approximately 17 Bark spectrum values are needed, and for $f_s$=44.1 kHz approximately 25 Bark spectrum values are needed. Assuming an inter-band spreading into higher subbands of −10 dB per Bark frequency band and differential encoding with 2.5 dB precision, approximately 3 bits per Bark coefficient is needed. The weighted transform coefficients can be quantized (converted from continuous to discrete values) by means of a scalar quantizer.

Specifically, with regard to scalar quantization, the final weighting function w(k) determines the spectral shape of the quantization noise that would be minimally perceived, as per the model discussed above. Therefore, each subband frequency coefficient X(k) should be quantized with a step size proportional to w(k). An equivalent procedure is to divide all X(k) by the weighting function, and then apply uniform quantization with the same step size for all coefficients X(k). A typical implementation is to perform the following:

```
Xr=round(X/dt); % quantize

Xqr=(Xr+Rqnoise)*dt; % scale back, adding pseudo-random noise
```

where dt is the quantization step size. The vector Rqnoise is composed of pseudo-random variables uniformly distributed in the interval [−γ, γ], where γ is a parameter preferably chosen between 0.1 and 0.5 times the quantization step size dt. By adding that small amount of noise to the reconstructed coefficients (a decoder operation), the artifacts caused by missing spectral components can be reduced. This can be referred to as dithering, pseudo-random quantization, or noise filling.

Encoding

The classical discrete source coding problem in information theory is that of representing the symbols from a source in the most economical code. For instance, it is assumed that the source emits symbols $s_i$ at every instant i, and the symbols $s_i$ belongs to an alphabet Z. Also, it is assumed that symbols $s_i$ and $s_j$ are statistically independent, with probability distribution $Prob\{s_i=Z_n\}=P_n$, where n=0,1, . . . , N−1, and N is the alphabet size, i.e., the number of possible symbols. From this, the code design problem is that of finding a representation for the symbols $s_i$'s in terms of channel symbols, usually bits.

A trivial code can be used to assign an M-bit pattern for each possible symbol value $Z_n$., as in the table below:

| Source Symbol | Code Word |
|---|---|
| $z_0$ | 00 . . . 000 |
| $z_1$ | 00 . . . 001 |
| $z_2$ | 00 . . . 010 |
| : | : |
| $z_{n-1}$ | 11 . . . 111 |

In that case, the code uses M per symbol. It is clear that an unique representation requires $M \geqq \log_2(N)$.

A better code is to assign variable-length codewords to each source symbol. Shorter codewords are assigned to more probable symbols; longer codewords to less probable ones. As an example, consider a source has alphabet Z={a, b,c,d} and probabilities $\rho_a=½, \rho_b=\rho_c=p_c=⅙$. One possible variable-length code for that source would be:

| Source Symbol | Code Word |
|---|---|
| A | 0 |
| B | 10 |
| C | 110 |
| D | 111 |

For long messages, the expected code length L is given by $L=\Sigma\rho_n I_n$, in bits per source symbol, where $I_n$ is the length of the code symbol $z_n$. This is better than the code length for the trivial binary code, which would require 2 bits/symbol.

In the example above, the codewords were generated using the well-known Huffman algorithm. The resulting codeword assignment is known as the Huffman code for that source. Huffman codes are optimal, in the sense of minimizing the expected code length L among all possible variable-length codes. Entropy is a measure of the intrinsic information content of a source. The entropy is measured in bits per symbol by $E=-\Sigma\rho_n\log_2(\rho_n)$. A coding theorem states that the expected code length for any code cannot be less than the source entropy. For the example source above, the entropy is $E=-(½)\log_2(½)-(½)\log_2(⅙)=1.793$ bits/symbol. It can be seen that the Huffman code length is quite close to the optimal.

Another possible code is to assign fixed-length codewords to strings of source symbols. Such strings have variable length, and the efficiency of the code comes from frequently appearing long strings being replaced by just one codeword. One example is the code in the table below. For that code, the codeword has always four bits, but represents strings of different length. The average source string length can be easily computed from the probabilities in that table, and it turns out to be K=25/12=2.083. Since these strings are represented by four bits, the bit rate is 4*12/25=1.92 bits/symbol.

| Source String | String Probability | Code Word |
|---|---|---|
| D | 1/6 | 0000 |
| Ab | 1/12 | 0001 |
| Ac | 1/12 | 0010 |
| Ad | 1/12 | 0011 |
| Ba | 1/12 | 0100 |
| Bb | 1/36 | 0101 |
| Bc | 1/36 | 0110 |
| Bd | 1/36 | 0111 |
| Ca | 1/12 | 1000 |
| Cb | 1/36 | 1001 |
| Cc | 1/36 | 1010 |
| Cd | 1/36 | 1011 |
| Aaa | 1/8 | 1100 |
| Aab | 1/24 | 1101 |
| Aac | 1/24 | 1110 |
| Aad | 1/24 | 1111 |

In the example above, the choice of strings to be mapped by each codeword (i.e., the string table) was determined with a technique described in a reference by B. P. Tunstall entitled, "Synthesis of noiseless compression codes," Ph.D dissertation, Georgia Inst. Technol., Atlanta, Ga., 1967. The code using that table is called Tunstall code. It can be shown that Tunstall codes are optimal, in the sense of minimizing the expected code length L among all possible variable-to-fixed-length codes. So, Tunstall codes can be viewed as the dual of Huffman codes.

In the example, the Tunstall code may not be as efficient as the Huffman code, however, it can be shown, that the performance of the Tunstall code approaches the source entropy as the length of the codewords are increased, i.e. as the length of the string table is increased. In accordance with the present invention, Tunstall codes have advantages over Huffman codes, namely, faster decoding. This is because each codeword has always the same number of bits, and therefore it is easier to parse (discussed in detail below).

Figure 15:
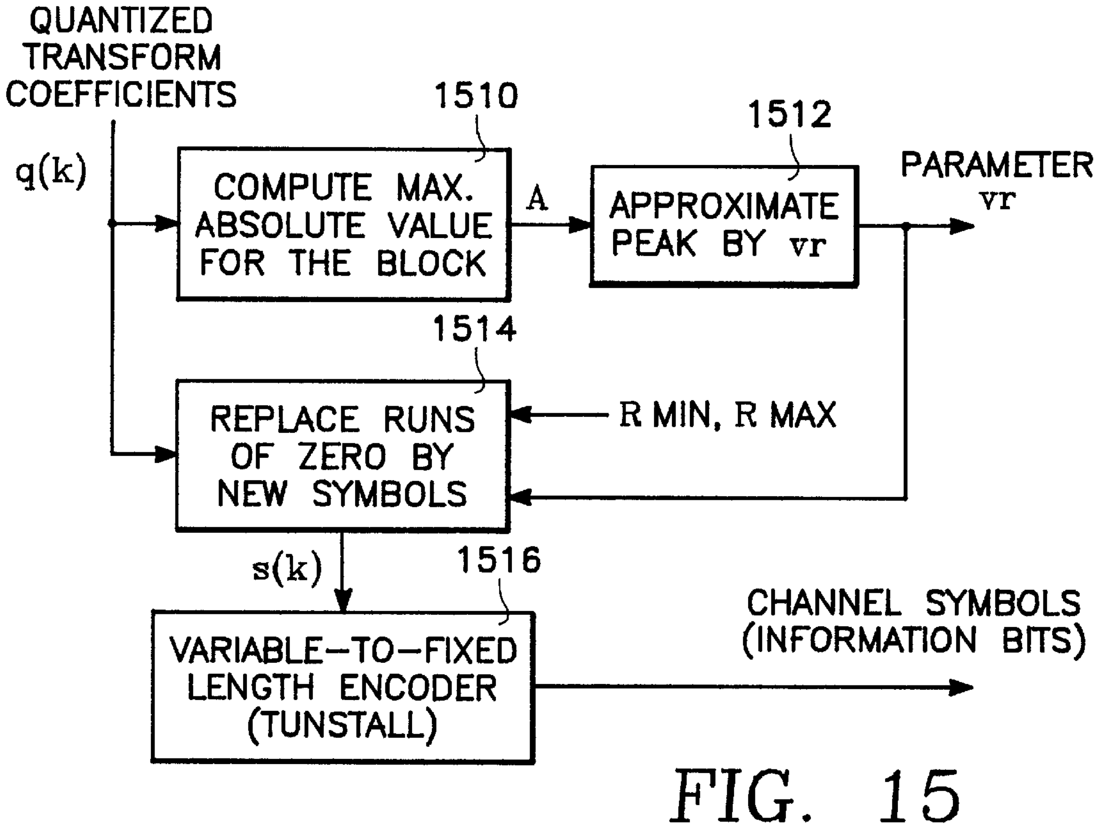
FIG. 15 is a flow diagram illustrating a system and method for performing entropy encoding in accordance with the present invention.

Therefore, the present invention preferably utilizes an entropy encoder as shown in FIG. 15, which can be a run-length encoder and Tunstall encoder. Namely, FIG. 15 is a flow diagram illustrating a system and method for performing entropy encoding in accordance with the present invention. Referring to FIG. 15 along with FIG. 3 and in accordance with the present invention, FIG. 15 shows an encoder that is preferably a variable length entropy encoder.

The entropy is an indication of the information provided by a model, such as a probability model (in other words, a measure of the information contained in message). The preferred entropy encoder produces an average amount of information represented by a symbol in a message and is a function of a probability model (discussed in detail below) used to produce that message. The complexity of the model is increased so that the model better reflects the actual distribution of source symbols in the original message to reduce the message. The preferred entropy encoder encodes the quantized coefficients by means of a run-length coder followed by a variable-to-fixed length coder, such as a conventional Tunstall coder.

A run-length encoder reduces symbol rate for sequences of zeros. A variable-to-fixed length coder maps from a dictionary of variable length strings of source outputs to a set of codewords of a given length. Variable-to-fixed length codes exploit statistical dependencies of the source output. A Tunstall coder uses variable-to-fixed length codes to maximize the expected number of source letters per dictionary string for discrete, memoryless sources. In other words, the input sequence is cut into variable length blocks so as to maximize the mean message length and each block is assigned to a fixed length code.

Previous coders, such as ASPEC, used run-length coding on subsets of the transform coefficients, and encoded the nonzero coefficients with a vector fixed-to-variable length coder, such as a Huffman coder. In contrast, the present invention preferably utilizes a run-length encoder that operates on the vector formed of all quantized transform coefficients, essentially creating a new symbol source, in which runs of quantized zero values are replaced by symbols that define the run lengths. The run-length encoder of the present invention replaces runs of zeros by specific symbols when the number of zeros in the run is in the range $[R_{min}, R_{max}]$. In certain cases, the run-length coder can be turned off by, for example, simply by setting $R_{max}<R_{min}$.

The Tunstall coder is not widely used because the efficiency of the coder is directly related to the probability model of the source symbols. For instance, when designing codes for compression, a more efficient code is possible if there is a good model for the source, i.e., the better the model, the better the compression. As a result, for efficient coding, a good probability distribution model is necessary to build an appropriate string dictionary for the coder. The present invention, as described below, utilizes a sufficient probability model, which makes Tunstall coding feasible and efficient.

In general, as discussed above, the quantized coefficients are encoded with a run-length encoder followed by a variable-to-fixed length block encoder. Specifically, first, the quantized transform coefficients q(k) are received as a block by a computation module for computing a maximum absolute value for the block (box 1510). Namely, all quantized values are scanned to determine a maximum magnitude $A=\max|Xr(k)|$. Second, A is quantized by an approximation module (box 1512) for approximating A by $vr \geqq A$, with vr being a power of two in the range [4, 512]. The value of vr is therefore encoded with 3 bits and sent to the decoder. Third, a replace module receives q(k) and is coupled to the approximation and replaces runs of zeros in the range $[R_{min}, R_{max}]$ by new symbols (box 1514) defined in a variable-to-fixed length encoding dictionary that represents the length of the run (box 1610 of FIG. 16, described in detail below). This dictionary is computed by parametric modeling techniques in accordance with the present invention, as described below and referenced in FIG. 16. Fourth, the resulting values s(k) are encoded by a variable-to-fixed-length encoder (box 1516), such as a Tunstall encoder, for producing channel symbols (information bits). In addition, since the efficiency of the entropy encoder is directly dependent on the probability model used, it is desirable to incorporate a good parametric model in accordance with the present invention, as will be discussed below in detail.

Parametric Modeling

Figure 16:
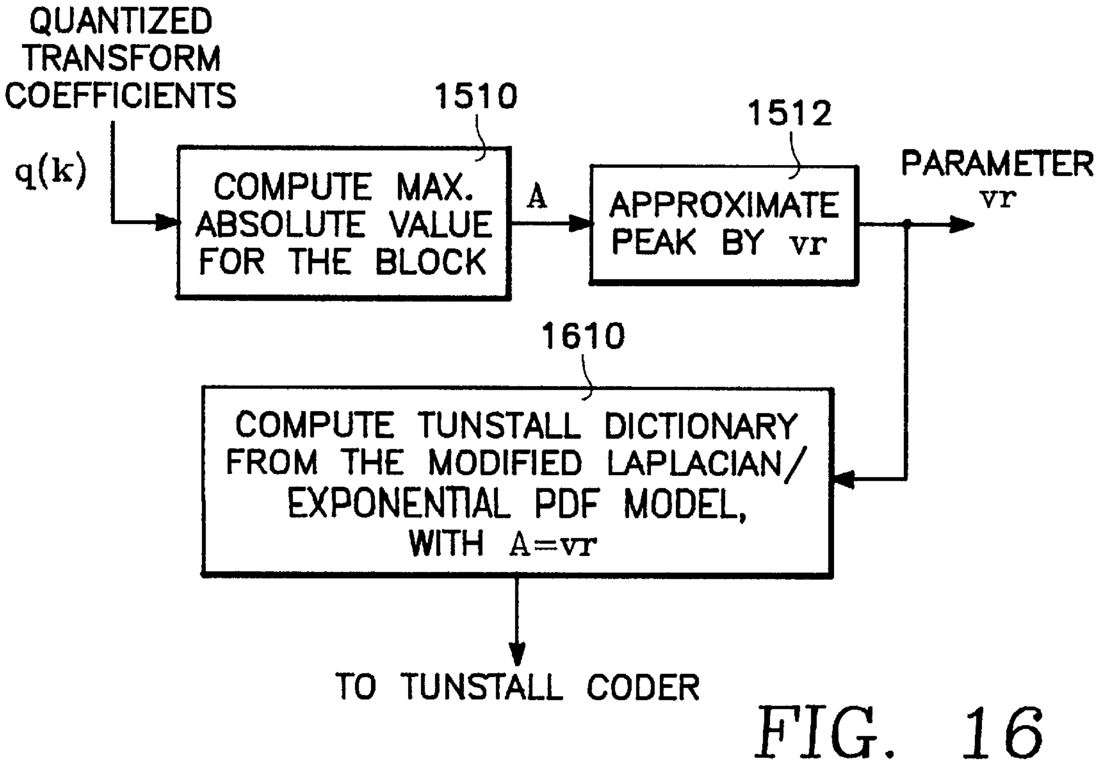
FIG. 16 is a flow diagram illustrating a system and method for performing parametric modeling in accordance with the present invention.

FIG. 16 is a flow diagram illustrating a system and method for performing entropy encoding with probability modeling in accordance with the present invention. As discussed above, the efficiency of the entropy encoder is directly related to the quality of the probability model. As shown in FIG. 16, the coder requires a dictionary of input strings, which can be built with a simple algorithm for compiling a dictionary of input strings from symbol probabilities (discussed below in detail). Although an arithmetic coder or Huffman coder can be used, a variable-to-fixed length encoder, such as the Tunstall encoder described above, can achieve efficiencies approaching that of an arithmetic coder with a parametric model of the present invention and with simplified decoding. This is because the Tunstall codewords all have the same length, which can be set to one byte, for example.

Further, current transform coders typically perform more effectively with complex signals, such as music, as compared to simple signals, such as clean speech. This is due to the higher masking levels associated with such signals and the type of entropy encoding used by current transform coders. Hence, with clean speech, current transform coders operating at low bit rates may not be able to reproduce the fine harmonic structure. Namely, with voiced speech and at rates around 1 bit/sample, the quantization step size is large enough so that most transform coefficients are quantized to zero, except for the harmonics of the fundamental vocal tract frequency. However, with the entropy encoder described above and the parametric modeling described below, the present invention is able to produce better results than those predicted by current entropy encoding systems, such as first-order encoders.

In general, parametric modeling of the present invention uses a model for a probability distribution function (PDF) of the quantized and run-length encoded transform coefficients. Usually, codecs that use entropy coding (typically Huffman codes) derive PDFs (and their corresponding quantization tables) from histograms obtained from a collection of audio samples. In contrast, the present invention utilizes a modified Laplacian+exponential probability density fitted to every incoming block, which allows for better encoding performance. One advantage of the PDF model of the present invention is that its shape is controlled by a single parameter, which is directly related to the peak value of the quantized coefficients. That leads to no computational overhead for model selection, and virtually no overhead to specify the model to the decoder. Finally, the present invention employs a binary search procedure for determining the optimal quantization step size. The binary search procedure described below, is much simpler than previous methods, such as methods that perform additional computations related to masking thresholds within each iteration.

Specifically, the probability distribution model of the present invention preferably utilizes a modified Laplacian+ exponential probability density function (PDF) to fit the histogram of quantized transform coefficients for every incoming block. The PDF model is controlled by the parameter A described in box 1510 of FIG. 15 above (it is noted that A is approximated by vr, as shown by box 1512 of FIG. 15). Thus, the PDF model is defined by:

$$Pr(s=m)=\begin{cases}\beta_1[\exp(-d_L(|m-A|^{0.9}-1))+0.01], & m\le 2A,\ m\ne A\\ 0.25, & m=A\ (\text{or } q=0)\\ \beta_2, & 2A+2\le m<2A+4\\ \beta_2[\exp(-d_R(|m-A|^{0.8}-1))+0.01], & m\ge 2A+4\end{cases}$$

where the transformed and run-length encoded symbols s belong to the following alphabet:

| Quantized value q(k) | Symbol |
|---|---|
| −A, −A + 1, . . ., A | 0, 1, . . ., 2A |
| Run of $R_{min}$ zeros | 2A + 1 |
| Run of $R_{min}$ + 1 zeros | 2A + 2 |
| : | : |
| Run of $R_{max}$ zeros | 2A + 1 + $R_{max}$ − $R_{min}$ |

With regard to the binary search for step size optimization, the quantization step size dt, used in scalar quantization as described above, controls the tradeoff between reconstruction fidelity and bit rate. Smaller quantization step sizes lead to better fidelity and higher bit rates. For fixed-rate applications, the quantization step size dt needs to be iteratively adjusted until the bit rate at the output of the symbol encoder (Tunstall) matches the desired rate as closely as possible (without exceeding it).

Several techniques can be used for adjusting the step size are possible. One technique includes: 1) Start with a quantization step size, expressed in dB, dt=dt0, where dt0 is a parameter that depends on the input scaling. 2) Set kdd=16, and check the rate obtained with dt. If it is above the budget, change the step size by dt=dt+kdd, otherwise change it by dt=dt−kdd. 3) Repeat the process above, dividing kdd by two at each iteration (binary search), until kdd=1, i.e., the optimal step size is determined within 1 dB precision. It is easy to see that this process can generate at most 64 different step sizes, and so the optimal step size is represented with 7 bits and sent to the decoder.

Referring back to FIG. 6, a general block/flow diagram illustrating a system for decoding audio signals in accordance with the present invention is shown. The decoder applies the appropriate reverse processing steps, as shown in FIG. 6. A variable-to-fixed length decoder (such as a Tunstall decoder) and run-length decoding module receives the encoded bitstream and side information relating to the PDF range parameter for recovering the quantized transform coefficients. A uniform dequantization module coupled to the variable-to-fixed length decoder and run-length decoding module reconstructs, from uniform quantization for recovering approximations to the weighted NMLBT transform coefficients. An inverse weighting module performs inverse weighting for returning the transform coefficients back to their appropriate scale ranges for the inverse transform. An inverse NMLBT transform module recovers an approximation to the original signal block. The larger the available channel bit rate, the smaller is the quantization step size, and so the better is the fidelity of the reconstruction.

It should be noted that the computational complexity of the decoder is lower than that of the encoder for two reasons. First, variable-to-fixed length decoding, such as Tunstall decoding (which merely requires table lookups) is faster than its counterpart encoding (which requires string searches). Second, since the step size is known, dequantization is applied only once (no loops are required, unlike at the encoder). However, in any event, with both the encoder and decoder, the bulk of the computation is in the NMLBT, which can be efficiently computed via the fast Fourier transform.

The foregoing description of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

What is claimed is:

1. A coder stored on computer readable memory of a computer system for coding an input signal, the coder comprising a multi-resolution transform processor for receiving the input signal and producing a nonuniform modulated lapped biorthogonal transform having transform coefficients and a weighting processor with a masking threshold spectrum processor for masking quantization noise by spectrally weighting and partially whitening the transform coefficients.

2. The coder of claim 1, further comprising a uniform quantizer for converting continuous values to discrete values.

3. The coder of claim 1, further comprising an entropy encoder for encoding the transform coefficients.

4. The coder of claim 3, further comprising a parametric modeling processor for producing a dictionary of input strings from symbol probabilities, wherein the input strings are used by the entropy encoder.

5. The coder of claim 3, wherein the entropy encoder is a combined run length encoder and variable-to-fixed length encoder.

6. The coder of claim 1, further comprising a multiplexor for combining signals for transmission over a single medium.

7. A decoder stored on computer readable memory of a computer system for decoding an encoded input signal having a nonuniform modulated lapped biorthogonal transform with transform coefficients, the decoder comprising an inverse weighting processor with an inverse masking threshold spectrum processor adapted to receive the encoded signal for demasking quantization noise and an inverse multi-resolution transform processor for receiving a demasked encoded signal and the nonuniform modulated lapped biorthogonal transform of the encoded signal to produce an output signal as a perceptually transparent reproduction of the input signal.

8. The decoder of claim 7, further comprising an inverse uniform quantizer for dequantizing the encoded signal.

9. The decoder of claim 7, further comprising an entropy decoder for decoding the transform coefficients.

10. The decoder of claim 9, further comprising an inverse parametric modeling processor for producing a dictionary of input strings from symbol probabilities, wherein the input strings are used by the entropy decoder.

11. The decoder of claim 9, wherein the entropy decoder is a combined run length decoder and variable-to-fixed length decoder.

12. The coder of claim 7, further comprising a uniform quantizer for converting continuous values to discrete values.

13. A computer implemented method for encoding an input signal comprising:

receiving the input signal and computing a modulated lapped transform;

modifying the modulated lapped transform to create a nonuniform modulated lapped biorthogonal transform with transform coefficients; and computing weighting functions having auditory masking capabilities and applying the weighting functions to the transform coefficients of the nonuniform modulated lapped biorthogonal transform.

14. The method of claim 13, further comprising entropy encoding the transform coefficients.

15. The method of claim 14, further comprising modeling a dictionary of input strings from symbol probabilities, wherein the input strings are used by the entropy encoder.

16. The method of claim 14, wherein the transform coefficients are entropy encoded by run length encoding and variable-to-fixed length encoding.

17. The method of claim 13, further comprising combining signals for transmission over a single medium.

18. The method of claim 13 further comprising quantizing the weighted transform coefficients to produce quantized coefficients defined by a set of discrete values, wherein the distance between the discrete values is defined by a step size.

19. A computer implemented method for encoding an input signal comprising:

receiving the input signal and computing a modulated lapped transform;

modifying the modulated lapped transform to create a nonuniform modulated lapped biorthogonal transform with transform coefficients;

computing weighting functions having auditory masking capabilities and applying the weighting functions to the transform coefficients of the nonuniform modulated lapped biorthogonal transform; and partially whitening the weighting functions.

20. A computer implemented method for encoding an input signal comprising:

receiving the input signal and computing a modulated lapped transform;

modifying the modulated lapped transform to create a nonuniform modulated lapped biorthogonal transform with transform coefficients; and computing weighting functions having auditory masking capabilities and applying the weighting functions to the transform coefficients of the nonuniform modulated lapped biorthogonal transform;

quantizing the weighted transform coefficients to produce quantized coefficients defined by a set of discrete values, wherein the distance between the discrete values is defined by a step size; and optimizing the step size with a binary search.

* * * * *